(12) United States Patent
Hashemi Talkhooncheh et al.

(10) Patent No.: US 11,296,794 B2
(45) Date of Patent: Apr. 5, 2022

(54) OPTICAL MODULATOR AND METHOD OF USE

(71) Applicants: ROCKLEY PHOTONICS LIMITED, London (GB); CALIFORNIA INSTITUTE OF TECHNOLOGY, Pasadena, CA (US)

(72) Inventors: Arian Hashemi Talkhooncheh, Pasadena, CA (US); Azita Emami, Pasadena, CA (US); Yi Zhang, Pasadena, CA (US); Aaron Zilkie, Pasadena, CA (US)

(73) Assignees: Rockley Photonics Limited, Altrincham (GB); California Institute of Technology, Pasadena, CA (US)

( * ) Notice: Subject to any disclaimer, the term of this patent is extended or adjusted under 35 U.S.C. 154(b) by 0 days.

(21) Appl. No.: 16/494,675

(22) PCT Filed: Mar. 15, 2018

(86) PCT No.: PCT/EP2018/056540
§ 371 (c)(1),
(2) Date: Sep. 16, 2019

(87) PCT Pub. No.: WO2018/172183
PCT Pub. Date: Sep. 27, 2018

(65) Prior Publication Data
US 2020/0099454 A1 Mar. 26, 2020

Related U.S. Application Data

(60) Provisional application No. 62/473,011, filed on Mar. 17, 2017.

(51) Int. Cl.
*H04B 10/50* (2013.01)
*G02F 1/015* (2006.01)
(Continued)

(52) U.S. Cl.
CPC ......... *H04B 10/5053* (2013.01); *G02F 1/015* (2013.01); *G02F 1/2257* (2013.01);
(Continued)

(58) Field of Classification Search
CPC ... H04B 10/5053; H04B 10/541; G02F 1/015; G02F 1/2257; G02F 2001/0155; G02F 2001/212; G02F 1/225
(Continued)

(56) References Cited

U.S. PATENT DOCUMENTS 6,211,996 B1 * 4/2001 Fuse ..................... H03C 7/00
359/238
8,050,555 B2 * 11/2011 McBrien ................ G02F 1/225
398/16
(Continued)

FOREIGN PATENT DOCUMENTS

WO WO 2014/068197 A1 5/2014

OTHER PUBLICATIONS

"28-Gbaud InP Square or Hexagonal 16-QAM Modulator", C. R. Doerr, et al., OSA/OFC/NFOEC 2011, (Year: 2011).*
(Continued)

*Primary Examiner* — Abbas H Alagheband
(74) *Attorney, Agent, or Firm* — Lewis Roca Rothgerber Christie LLP

(57) ABSTRACT

An optoelectronic device for quadrature-amplitude modulation (QAM) and a method of modulating light according to the same. The device comprising: an input waveguide; two intermediate waveguides, each coupled to the input waveguide via an input coupler; and an output waveguide, coupled to each of the intermediate waveguides via an output coupler; wherein each intermediate waveguide includes a modulating component connected in series with a phase shifting component, and each modulating component
(Continued)

is connected to a respective electronic driver, the electronic drivers together being operable to produce a QAM-N modulated output from light entering the device from the input waveguide.

18 Claims, 27 Drawing Sheets

(51) Int. Cl.
  *G02F 1/225* (2006.01)
  *H04B 10/54* (2013.01)
  *G02F 1/21* (2006.01)
(52) U.S. Cl.
  CPC ......... *H04B 10/541* (2013.01); *G02F 1/0155* (2021.01); *G02F 1/212* (2021.01); *H04B 10/50575* (2013.01); *H04B 10/50595* (2013.01)
(58) Field of Classification Search
  USPC ....................................................... 398/188
  See application file for complete search history.

(56) References Cited

U.S. PATENT DOCUMENTS

| | | | | |
|---|---|---|---|---|
| 8,588,556 | B1* | 11/2013 | Dong ................... | G02F 1/025 385/3 |
| 8,879,873 | B2* | 11/2014 | Goh ................... | H04B 10/5053 385/3 |
| 8,989,600 | B2* | 3/2015 | Nakamoto ........... | H04B 10/541 398/188 |
| 9,843,390 | B2* | 12/2017 | Liu ................... | H04B 10/25137 |
| 9,864,254 | B2 | 1/2018 | Kazmierski et al. | |
| 10,284,302 | B2* | 5/2019 | Kawaai ............... | H04B 10/516 |
| 10,587,346 | B2* | 3/2020 | Fujita .................. | H04B 10/516 |
| 2006/0263098 | A1* | 11/2006 | Akiyama ........... | H04B 10/5561 398/188 |
| 2007/0230617 | A1* | 10/2007 | Tao ....................... | G02F 1/2255 375/302 |
| 2009/0097843 | A1* | 4/2009 | McBrien .............. | H04B 10/505 398/16 |
| 2009/0169148 | A1* | 7/2009 | Doerr ................. | H04B 10/5053 385/3 |
| 2009/0323164 | A1* | 12/2009 | Miyazaki ................ | G02F 1/225 359/279 |
| 2010/0014874 | A1* | 1/2010 | Kawanishi ......... | H04B 10/5563 398/187 |
| 2010/0046886 | A1* | 2/2010 | Doerr ..................... | G02B 6/105 385/27 |
| 2010/0080571 | A1* | 4/2010 | Akiyama ................ | H04J 14/06 398/184 |
| 2010/0111466 | A1* | 5/2010 | Doerr .................... | G02F 1/2257 385/3 |
| 2011/0158577 | A1* | 6/2011 | Doerr .................... | G02F 1/2257 385/3 |
| 2012/0229886 | A1* | 9/2012 | Chen .................... | H04B 10/506 359/326 |
| 2012/0308240 | A1* | 12/2012 | Akiyama ........... | H04B 10/5053 398/141 |
| 2012/0315036 | A1* | 12/2012 | Kucharski ............. | G02F 1/0121 398/43 |
| 2012/0327961 | A1* | 12/2012 | Poon ..................... | H04B 10/504 372/26 |
| 2013/0108277 | A1* | 5/2013 | Liu ..................... | H04B 10/5053 398/184 |
| 2013/0170841 | A1* | 7/2013 | Liu ....................... | H04B 10/541 398/183 |
| 2013/0195394 | A1* | 8/2013 | Hosokawa ............. | G02F 1/0123 385/3 |
| 2013/0322809 | A1* | 12/2013 | Goh .................... | H04B 10/5053 385/3 |
| 2014/0133870 | A1* | 5/2014 | Lee .................... | H04B 10/5053 398/186 |
| 2014/0153075 | A1 | 6/2014 | Malacarne et al. | |
| 2014/0153077 | A1* | 6/2014 | Kawakami ........... | H04L 27/364 359/259 |
| 2015/0198859 | A1* | 7/2015 | Chen ..................... | G02F 1/2257 385/3 |
| 2016/0054640 | A1* | 2/2016 | Khurgin ................ | G02F 1/2257 385/3 |
| 2016/0218811 | A1* | 7/2016 | Chen ................... | H04B 10/5561 |
| 2016/0363835 | A1* | 12/2016 | Nagarajan ............... | G02F 1/025 |
| 2017/0026133 | A1* | 1/2017 | Antona .................. | H04B 10/54 |
| 2017/0149503 | A1* | 5/2017 | Liu ..................... | H04B 10/2507 |
| 2018/0034555 | A1* | 2/2018 | Goh ........................ | G02B 6/122 |
| 2018/0173077 | A1* | 6/2018 | Schmogrow .......... | G02F 1/2255 |
| 2018/0205465 | A1* | 7/2018 | Tanaka .................... | G02F 1/025 |
| 2018/0267384 | A1* | 9/2018 | Padmaraju ............ | G02F 1/0123 |
| 2019/0036611 | A1* | 1/2019 | Fujita ................... | H04B 10/564 |

OTHER PUBLICATIONS

Daunt, Chris L. M. et al., "Correction Methods for Electroabsorption Modulator-Based Phase-Shift Keying Photonic Integrated Circuits", IEEE Journal of Selected Topics in Quantum Electronics, Nov./Dec. 2013, 7 pages, vol. 19, No. 6, IEEE.
International Search Report and Written Opinion of the International Searching Authority, dated Aug. 9, 2018, Corresponding to PCT/EP2018/056540, 19 pages.
Neilson, D.T. et al., "EAM-based InP MZ modulator for 40-Gb/s PSBT using 20-Gb/s tributaries", ECOC 2008, Brussels, Belgium, Sep. 21-25, 2008, pp. 1-2, IEEE.
Doerr, C. R. et al., "28-Gbaud InP Square or Hexagonal 16-QAM Modulator", OSA/OFC/NFOEC, Mar. 2011, 4 pages.
Huang, W-J. et al., "Optical DAC for Generation of PAM4 Using Parallel Electro-Absorption Modulators", 42nd European Conference and Exhibition on Optical Communications, Sep. 18-22, 2016, Düsseldorf, pp. 1118-1120, Vde Verlag Gmbh.
Jeong S-H. et al., "Compact optical 90° hybrid employing a tapered 2×4 MMI coupler serially connected by a 2×2 MMI coupler", Optics Express, Mar. 1, 2010, pp. 4275-4288, vol. 18, No. 5, Optical Society of America.
Verbist, J et al., "DAC-less and DSP-free PAM-4 Transmitter at 112 Gb/s with Two Parallel GeSi Electro-Absorption Modulators", ECOC PDP, 2017, 3 pages.

* cited by examiner

OPTICAL MODULATOR AND METHOD OF USE

CROSS-REFERENCE TO RELATED APPLICATION(S)

This application is a national stage entry, under 35 U.S.C. § 371, of International Application Number PCT/EP2018/056540, filed on Mar. 15, 2018, which claims priority to and the benefit of U.S. Provisional Patent Application No. 62/473,011, filed Mar. 17, 2017. The entire contents of all of the applications identified in this paragraph are incorporated herein by reference.

FIELD OF THE INVENTION

The present invention relates to optoelectronic devices, and particularly to optoelectronic devices for quadrature-amplitude modulation and a method of modulating an optical signal in accordance with a quadrature-amplitude modulation scheme.

BACKGROUND

Quadrature-amplitude modulation (QAM) is a candidate modulation format for future optical interconnect modules, and may achieve 200 Gb/s per wavelength. This can be particularly suitable for inter-datacentre applications. In this modulation scheme, the information is encoded in the amplitude and the phase of the optical signal. In QAM-16, there are 16 points available in the in-phase-quadrature-phase complex plane. The points 101 are generally equally spaced, as shown in FIG. 1. Four specific bits can be associated to each symbol/point. The constellation size is chosen arbitrarily.

A series of pulses each with the characteristics of one of the 16 constellation points, representing four specific bits, can be sent to communicate information. According to different applications, the spacing, relative orientation, and the position of the centre point 102, would be subject to change.

Conventionally, optical QAM schemes are achieved by using a nested Mach-Zehnder in-phase modulators (MZ IQ modulators). In these configurations, a cascade of Y-junctions or 3-dB couplers are used to split or combine the light. A disadvantage to such configurations is the inherent 3-dB loss each time two optical branches are combined. In addition, increasing the number of couplers will result in an increase in the total optical loss which can be significant. This is because each 3-dB coupler has a certain insertion loss (typical compact structures have around 0.1 dB of insertion loss).

The use of ring resonator modulations has also been demonstrated in implementing a QAM-16 modulation scheme. However, they have a low practicality for a commercial product due to their high sensitivity to environmental conditions and fabrication tolerances. They would therefore require power intensive stabilization circuits.

There is a desire to provide a device suitable for QAM-16 modulation which does not suffer the above drawbacks.

Pulse-amplitude modulation (PAM) is a modulation format selected by an IEEE standards committee for achieving 50 Gb/s per lambda for next generation optical interconnects, where information comprising a message is encoded in the amplitude of a series of pulses comprising the signal.

In PAM-4 modulation, $2^2$ (=4) discrete pulse amplitudes are available, which are generally equally spaced in the linear regime as shown in FIG. 11.

1$^{st}$ SUMMARY OF INVENTION

Accordingly, in a first aspect the invention provides an optoelectronic device for quadrature-amplitude modulation (QAM), comprising:
- an input waveguide;
- two intermediate waveguides, each coupled to the input waveguide via an input coupler; and
- an output waveguide, coupled to each of the intermediate waveguides via an output coupler;

wherein each intermediate waveguide includes a modulating component connected in series with a phase shifting component, and each modulating component is connected to a respective electronic driver, the electronic drivers together being operable to produce a QAM-N modulated output from light entering the device from the input waveguide.

Such a device enables QAM-N, and preferably QAM-16, modulation in a compact (high integration density) transmitter. The device also requires a lower power consumption as compared to conventional devices, and the driver signals can be simpler. In some examples, the electronic drivers provide identical driver signals to each of the modulating components. There is no requirement for a digital-to-analogue-converter (DAC) in a device as per the present invention. Therefore, in some embodiments, there is no DAC provided in the device. By electronic driver, it may be meant that the electronic driver is an electronic driver chip.

By modulating component, it may be meant each intermediate waveguide includes either: a phase modulator, an amplitude modulator, or a phase modulator and an amplitude modulator. The electronic drivers may be operable to produce a QAM-16 modulated output.

Optional features of the invention will now be set out. These are applicable singly or in any combination with any aspect of the invention.

The phase shifting component within each intermediate waveguide may be a DC phase shifter. By DC phase shifter, it may be meant that a component provides a specific static phase shift that does not need to be changed frequently and significantly (i.e. does not need to be modulated, and should generally be regulated to a certain value).

Each electronic driver may be a PAM-4 electronic driver, such that the respective modulating component can operate in four modulation states. One of these modulation states may be where the modulating component does not alter the properties of the light passing therethrough, i.e. the characteristics of the light are not actively modified. However, for clarity, it is referred to as one of the four modulation states that may be provided.

The input coupler may be configured to equally split input light between the two intermediate waveguides. In this example, the modulating component may be an amplitude modulator. For example, the modulating component may be an electro-absorption modulator. Alternatively, the modulating component may be a ring modulator, or an amplitude modulating using polarization modulators.

The device may further comprise a DC phase shifting intermediate waveguide, coupled to the input waveguide and the output waveguide via the respective couplers, the DC phase shifting intermediate waveguide being configured to re-centre a constellation corresponding to the QAM-N outputs available from the device. This DC phase shifting intermediate waveguide may contain, asides from the waveguide itself, only a DC phase shifter. With the introduction of this intermediate waveguide, the light may be split between the two intermediate waveguides and the DC phase shifting waveguide at a ratio of 1:x:1, such that the power is split equally between the two intermediate waveguides and some fraction x is provided to the DC phase shifting waveguide. The value of x may be defined by the characteristics of the modulating components within the two intermediate waveguides. Since the characteristics of the modulator (i.e. extinction ratio, chirp and insertion loss for an EAM, or insertion loss in a phase modulator) will define the exact shape of the constellation diagram (e.g. size, shift from origin, and relative rotation), the power portion "x" in the extra arm should be such that it brings back the centre point of the constellation to the origin.

In further detail, if each intermediate waveguide is considered to have a representative vector in the IQ plane (see, e.g. FIG. 1) the vector corresponding to the DC phase shifter intermediate waveguide should have an amplitude proportional to the distance of the centre of the constellation to the origin, and a phase of 180° away from the phase of the centre-point vector, so that when it is combined with the vectors of the two intermediate waveguides it brings the centre point of the constellation back to the origin (0,0).

A static relative phase difference between the two intermediate waveguides may be set at 90°. This static relative phase difference may be set by the phase shifting component (e.g. DC phase shifter) within each intermediate waveguide.

The input coupler may be configured to split input light between the two intermediate waveguides at a ratio of 2:1 such that one of the waveguides receives twice the optical power of the other. In this example, the modulating component may be a phase modulator. For example, the phase modulator may be a heater, a pn junction, a p-i-n phase modulator, or a metal-oxide-semiconductor (MOS) based phase modulator. In this example, a static phase difference between the two intermediate waveguides may be set to 0°.

The two intermediate waveguides may be first and second intermediate waveguides, and the device may further comprise a third intermediate waveguide and a fourth intermediate waveguide, each coupled to the input waveguide via the input coupler and coupled to the output waveguide via the output coupler. The third and fourth intermediate waveguides may each include a modulating component connected in series with a phase shifting component and each modulating component may be connected to an electronic driver, the electronic drivers of each of the first and second intermediate waveguides and third and fourth intermediate waveguides may be operable to produce a QAM-N modulated output from light entering the device from the input waveguide. The phase shifting component within the third and fourth intermediate waveguides may be a DC phase shifter. Each driver may be a binary non-return-to-zero driver, such that the respective modulating component can be operated in two modulation states. The input coupler may be configured to split input light between the intermediate waveguides at a ratio of 2:1:2:1, such that two of the waveguides receive twice the optical power of the other two. Where a DC phase shifting intermediate waveguide is also present, the input light may be split at a ratio of 2:1:x:2:1, where x is the amount provided to the DC phase shifting intermediate waveguide and defined by the modulation components characteristics. A static phase difference between the first intermediate waveguide and the second intermediate waveguide may be 180°, and a static phase difference between the third intermediate waveguide and the fourth intermediate waveguide may be 180°. A static phase difference between the first intermediate waveguide and the third intermediate waveguide may be 90°, and a static phase difference between the second intermediate waveguide and the fourth intermediate waveguide may be 90°. Each modulating component may be a phase modulator (for example those discussed above), or each modulating component may be an amplitude modulator (for example those discussed above). The modulating components in all of the first to fourth intermediate waveguides may have substantially identical characteristics. For example, if the modulating components are all electro-absorption modulators they may all have the same length.

Where the device includes first, second, third, and fourth intermediate waveguides and also includes a DC phase shifting intermediate waveguide, the light may be split between the five intermediate waveguides at a ratio of 2:1:x:2:1 where 'x' is (as above) defined by the modulators characteristics.

Each intermediate waveguide may include two modulating components connected in series: a phase modulator; and an amplitude modulator.

Either or both of the input coupler and the output coupler may comprise at least one phase correcting channel, said phase correcting channel having a width, as measured in a direction perpendicular to a guiding direction of the channel, which varies along a direction parallel to the guiding direction of the channel. By channel, it may be meant that a path exists for an optical signal passing through the coupler. For example, if the coupler is a 1×5 coupler, it may comprise at least 5 channels at the output of the coupler.

In all examples of the invention, the modulating components within each of the intermediate waveguides may have the same modulating characteristics. For example, where the modulating component is an electro-absorption modulator, the electro-absorption modulators present in each of the intermediate waveguides should have the same length and other characteristics that affect their modulation.

In a second aspect, the invention provides a method of modulating an optical signal according to a quadrature-amplitude modulation (QAM) scheme, comprising:

providing an optical signal at an input waveguide;

splitting the optical signal into two intermediate waveguides, each coupled to the input waveguide via an input coupler;

modulating the amplitude and phase of the optical signal present in each of the intermediate waveguides, according to a QAM scheme and by respective modulating components connected in series with respective phase shifting components, said modulating components being respectively connected to and driven by an electronic driver; and recombining the optical signal into an output waveguide, coupled to each of the intermediate waveguides via an output coupler, wherein the recombined optical signal.

Optional features of the invention will now be set out. These are applicable singly or in any combination with any aspect of the invention.

The phase shifting component may be a DC phase shifter.

Each modulating component may be driven by a PAM-4 electronic driver so as to be operable in four modulation states.

The input coupler may equally split the optical signal between the two intermediate waveguides. The modulating component may be an amplitude modulator, for example an electro-absorption modulator, and may modulate the amplitude of the optical signal.

A DC phase shifting intermediate waveguide may be coupled to the input waveguide and the output waveguide via the respective couplers, and may re-centre a constellation corresponding to the QAM-N outputs.

A static phase difference between the two intermediate waveguides may be set at 90°.

The input coupler may split the optical signal between the two intermediate waveguides at a ratio of 2:1, such that one of the waveguides receives twice the optical power of the other. The modulating component may be a phase modulator. A static phase difference between the two intermediate waveguides may be set at 0°.

The two intermediate waveguides may be first and second intermediate waveguides, and the optical signal may be split between the first and second intermediate waveguide and also a third and fourth intermediate waveguide, the third and fourth intermediate waveguides may each be coupled to the input waveguide via the input coupler and coupled to the output waveguide via the output coupler. The amplitude and phase of the optical signal present in each of the intermediate waveguides may be modulated according to a QAM scheme by respective modulating components connected in series with respective phase shifting components. The phase shifting components may be DC phase shifters. Each modulating component may be driven by a non-return-to-zero electronic driver so as to be operable in two modulating states. The input coupler may split the optical signal between the intermediate waveguides at a ratio of 2:1:2:1, such that two of the waveguides receive twice the optical power of the other two. A static phase difference between the first intermediate waveguide and the second intermediate waveguide may be 180° and a static phase difference between the third intermediate waveguide and the fourth intermediate waveguide may be 180°. A static phase difference between the first intermediate waveguide and the third intermediate waveguide may be 90°, and a static phase difference between the second intermediate waveguide and the fourth intermediate waveguide may be 90°. Each modulating component may be a phase modulator, or each modulating component may be an amplitude modulator.

Each intermediate waveguide may include two modulating components connected in series: a phase modulating component; and an amplitude modulating component. Each modulating component may be driven by a non-return-to-zero electronic driver.

Either or both of the input coupler and the output coupler may comprise at least one phase correcting channel, said phase correcting channel having a width, as measured in a direction perpendicular to a guiding direction of the channel, which varies along a direction parallel to the guiding direction of the channel. By channel, it may be meant that a path exists for an optical signal passing through the coupler. For example, if the coupler is a 1×5 coupler, it may comprise at least 5 channels at the output of the coupler.

The method may be performed on an optoelectronic device according to the first aspect.

Aspects and embodiments of the present invention will now be discussed with reference to the accompanying figures. Further aspects and embodiments will be apparent to those skilled in the art. All documents mentioned in this text are incorporated herein by reference

2$^{nd}$ SUMMARY OF INVENTION

According, in a first aspect, the invention provides an optical device, operable to provide a PAM-N modulated output, comprising:

an input waveguide, configured to receive light;
a first electro-absorption modulator, coupled to receive light from the input waveguide, and operable to produce a first output or a second output, wherein the second output has a lower amplitude than the first output;
a second electro-absorption modulator, coupled to receive light from the input waveguide, and operable to produce a third output or a fourth output, wherein the fourth output has a lower amplitude than the third output; and
an output waveguide, coupled to receive light from the first electro-absorption modulator and the second electro-absorption modulator, and output a combined signal comprising an output of the first electro-absorption modulator and an output of the second electro-absorption modulator;
wherein the first electro-absorption modulator and the second electro-absorption modulator are disposed in parallel.

In a second aspect, the invention provides a Mach-Zehnder interferometer, comprising:
an input waveguide;
an output waveguide;
a first arm, optically connecting the input waveguide and the output waveguide;
a second arm, optically connecting the input waveguide and the output waveguide, the second arm being disposed in parallel with the first arm; and
at least two electro-absorption modulators, disposed respectively in the first arm and the second arm, and operable to provide PAM-N modulation.

Optional features of the invention will now be set out. These are applicable singly or in any combination with any aspect of the invention.

The optical device may further comprise:
a variable input coupler, disposed between the input waveguide and both of the first electro-absorption modulator and the second electro-absorption modulator.

The input coupler may be configured to modify the light transmitted to the first electro-absorption modulator and the second electro-absorption modulator such that adjacent PAM-N modulated outputs generated by the device are linearly spaced. The input coupler may be configured to unequally split input light between the first electro-absorption modulator and the second electro-absorption modulator. The input coupler may be a Mach-Zehnder interferometer, comprising an input coupler coupled to the input waveguide, two parallel arms and an output coupler. At least one of the parallel arms may include a phase-shifter.

Disposed between the output waveguide and the first electro-absorption modulator and the second electro-absorption modulator may be a variable output coupler. The output coupler may be configured to modify the received light from the first electro-absorption modulator and the second electro-absorption modulator such that adjacent PAM-N modulated outputs are linearly spaced. The output power of light which can be outputted by the coupler may be described by:

$$P_{OUT} = \left| \sqrt{(1-k)P_{in1}}\, e^{j\theta_1} + \sqrt{(k)P_{in2}}\, e^{j\theta_2} \right|^2$$

where $P_{OUT}$ is the output power, k is a coupling coefficient $P_{in1}$ is the input power from the first electro-absorption modulator, $\theta_1$ is the phase of light entering the coupler from the first electro-absorption modulator, $P_{in2}$ is the input power from the second electro-absorption modulator, and $\theta_2$ is the phase of light entering the coupler from the second electro-absorption modulator. k may be less than 0.44. The variable output coupler may a Mach-Zehnder interferometer, comprising an input coupler coupled to the first electro-absorption modulator and the second electro-absorption modulator, two parallel arms and an output coupler coupled to the output waveguide. At least one of the parallel arms may include a phase-shifter.

The optical device may further comprise:
a first analogue driver, said first driver configured to provide a first driver signal to the first electro-absorption modulator; and
a second analogue driver, said second driver configured to provide a second driver signal to the second electro-absorption modulator;
wherein, when driven by the respective driver signal, the first electro-absorption modulator produces the second output and the second electro-absorption modulator produces the fourth output. The first driver signal and the second driver signal are identical.

The two analogue drivers may be two driver circuits occupying a single driver chip. The drivers may independently provide voltages $V_1$ and $V_2$, which may have the same value or different values. $V_1$ and $V_2$ may both equal 2V. By using this configuration, it is possible to implement the conversion of a 2-bit symbol into 4 analogue optical states without the use of a digital-to-analogue-converter. One of the drivers can correspond to the least-significant bit, and the other may correspond to the most-significant bit.

The optical device may include a Mach-Zehnder interferometer, and the first electro-absorption modulator is disposed within a first arm of the Mach-Zehnder interferometer and the second electro-absorption modulator is disposed within a second arm of the Mach-Zehnder interferometer.

The device may include a phase-shifter associated with at least one of the electro-absorption modulators, said phase-shifter being operable to modify a phase shift associated with the respective electro-absorption modulator. The phase-shifter may be disposed within an arm of the Mach-Zehnder interferometer. The phase-shifter may be any one or more of: a heater; a PIN phase shifter; or a PN phase shifter.

The device may include a directional coupler coupled to the output waveguide, configured to redirect a portion of the output power for use to bias and stabilize the phase shifter. The portion of the output power may be less than 5%.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2A:
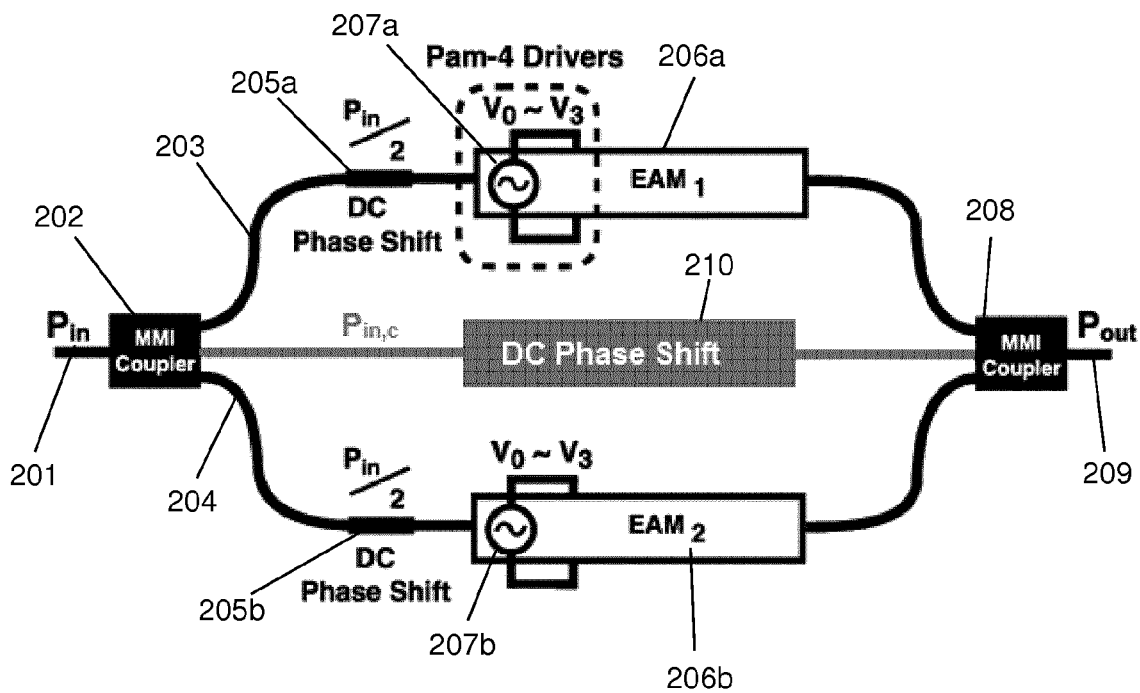
FIG. 2A shows a device for QAM-16 modulation.

FIG. 2A shows a schematic view of an optoelectronic device according to the present invention. An input waveguide 201, provides an optical signal with power $P_{in}$ to an input multi-mode interference coupler 202. The optical signal is split by the coupler into a first intermediate waveguide 203 and a second intermediate waveguide 204. The coupler is configured to split the optical signal at a ratio of 1:1 between the waveguides, and so each receives an optical signal with a power of $P_{in}/2$.

The first intermediate waveguide 203 includes, disposed along its optical path, a DC phase shifter 205a and an electro-absorption modulator 206a. The DC phase shifter is operated to apply a static phase shift to the optical signal as it is transmitted through the intermediate waveguide. The DC phase shifter may be implemented as a heater, a p-i-n junction, or a pn junction. The electro-absorption modulator 206a is driven by a PAM-4 driver 207a able to provide four operating voltages: $V_0$ to $V_3$. Each of these operating voltages corresponds to a modulating state of the electro-absorption modulator. In this way, the electro-absorption modulator 206a can be considered to provide a PAM-4 modulated output from the optical signal provided into the intermediate waveguide. In a 66 μm long elector-absorption modulator operating at a wavelength of 1543 nm, $V_0$ to $V_3$ may take values of: 0V, 0.4V, 1V, and 2V. These voltages may provide 4 equally spaced field outputs (and not intensity outputs). It should be noted that the voltages may not be equally spaced due to the non-linear behaviour of the EAM in this example.

Similarly, the second intermediate waveguide 204 includes, disposed along its optical path, a DC phase shifter 205b and an electro-absorption modulator 206b. The DC phase shifter is operated to apply a phase shift to the optical signal as it is transmitted through the intermediate waveguide. As with the previous electro-absorption modulator, this modulator 206b is also driven by a PAM-4 driver 207b able to provide four operating voltages: $V_0$ to $V_3$. Each of these operating voltages corresponds to a modulating state of the electro-absorption modulator. Both modulators may operable using the Franz-Keldysh effect, or the Quantum-confined Stark effect if the modulators contain quantum wells. In this way, the electro-absorption modulator 206b can be considered to provide a PAM-4 modulated output from the optical signal provided into the intermediate waveguide. The modulators may be silicon germanium based electro-absorption modulators.

An output multi-mode interference coupler 208 is connected to both the first and second intermediate waveguides. This coupler 208 recombines the optical signals transmitted through each intermediate waveguide, and provides an output signal with power $P_{out}$. As the optical signals provided by each intermediate waveguide are different (or can be different) in phase, the output signal can be modulated according to a QAM-16 scheme. The output coupler 208 is connected to an output waveguide 209, which allows the modulated signal to exit the device. Coupled between the input coupler 202 and the output coupler 202 is a DC phase shifter 210. This DC phase shifter 210 may be contained within a DC phase shifting intermediate waveguide, and may be used to bring the centre point of a constellation corresponding to the outputs of the device to the origin.

Figure 2B:
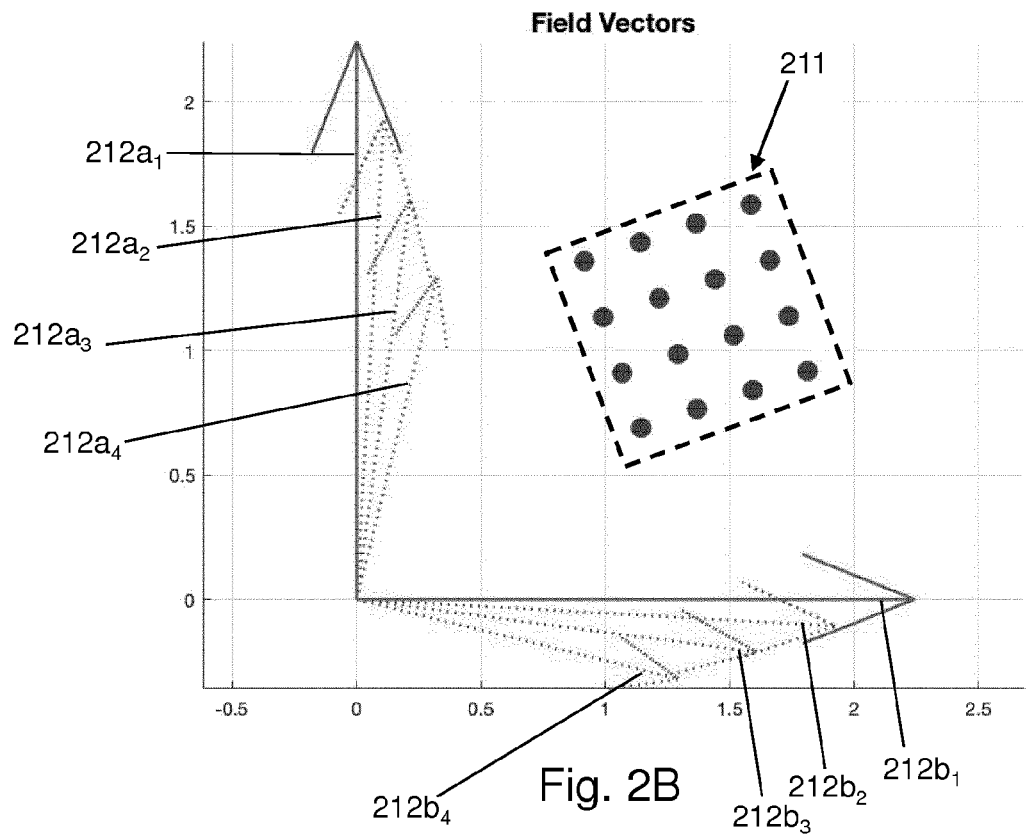
FIG. 2B shows a constellation diagram for the device in FIG. 2A.

A constellation diagram, showing the possible outputs, is shown in FIG. 2B. Sixteen points, shown in area 211, are available for transmitting information, and can be utilized by the combination of the optical signal modulated in each intermediate waveguide. Four possible modulation states are available from the modulator 206a in the first intermediate waveguide: $212a_1$, $212a_2$, $212a_3$, and $212a_4$. Modulation state $212a_1$ is achieved by not actively modulating the light passing through the amplitude modulator 206a. The remaining modulation states are achieved by applying increasing degrees of amplitude modulation. In this example, the four modulation states vary in amplitude and phase. The variation in phase is caused by the chirp of the modulator, and leads to the sixteen points in area 211 being arranged in an array which has been rotated. Similarly, four available modulation states are available from the modulator 206b: $212b_1$, $212b_2$, $212b_3$, and $212b_4$. Again, modulation state $212b_1$ is achieved by not actively modulating the light passing through the amplitude modulator 206b. The remaining modulation states are achieved by applying increasing degrees of amplitude modulation. It should be noted that in this example the modulators 206a and 206b are identical with respect to their modulating characteristics, e.g. length, extinction ratio, and chirp (i.e. an unintentional change in phase caused by the amplitude modulator).

Figure 3A:
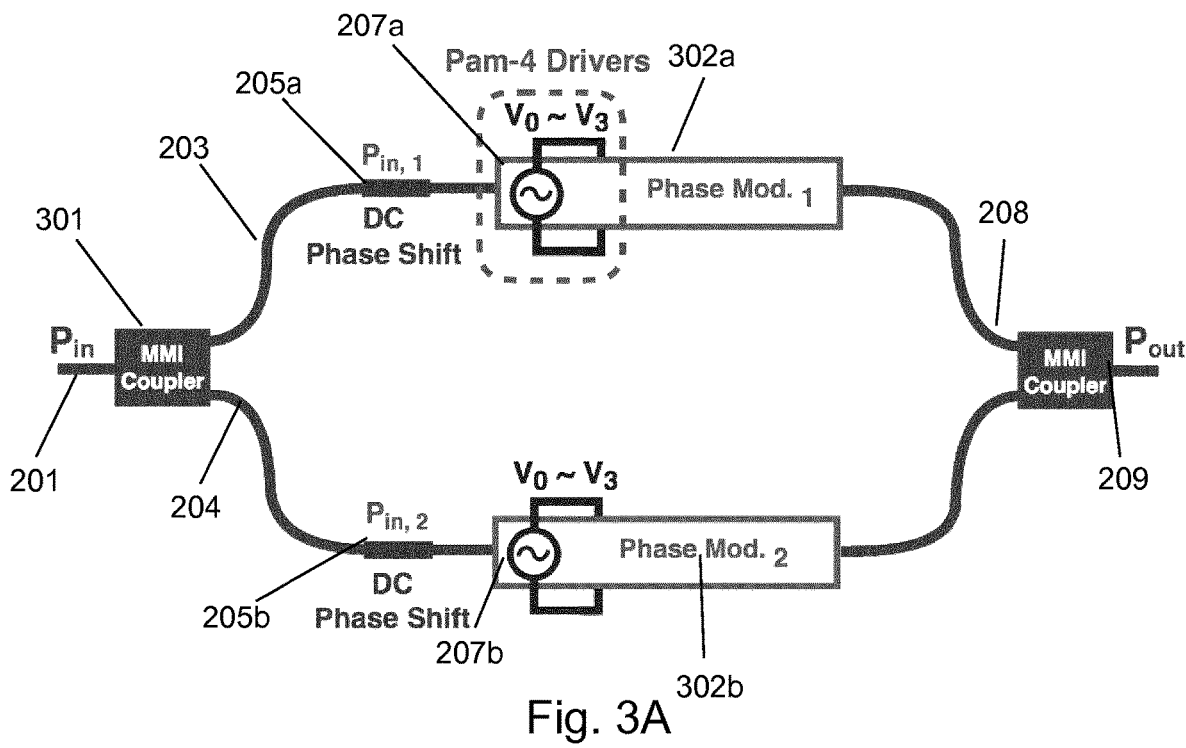
FIG. 3A shows a variant device for QAM-16 modulation.

FIG. 3A shows a variant optoelectronic device according to an embodiment of the invention. It shares a number of features with the device shown in FIG. 2A, and so like reference numerals are used for like features. A notable difference between this device and that shown in FIG. 2A, is that the modulating components 301a and 301b here are phase modulators. The phase modulators may operate by the Pockels effect. A further difference is that the optical signal is not split at a ratio of 1:1 as in the previous device. Instead, the input coupler 301 splits the optical signal at a ratio of 2:1 between the first and second intermediate waveguides. Therefore the first intermediate waveguide receives an optical signal with power $P_{in,1}$ and the second intermediate waveguide receives an optical signal with power $P_{in,2}$. The static relative phase difference in this example should be set to 0°.

Figure 3B:
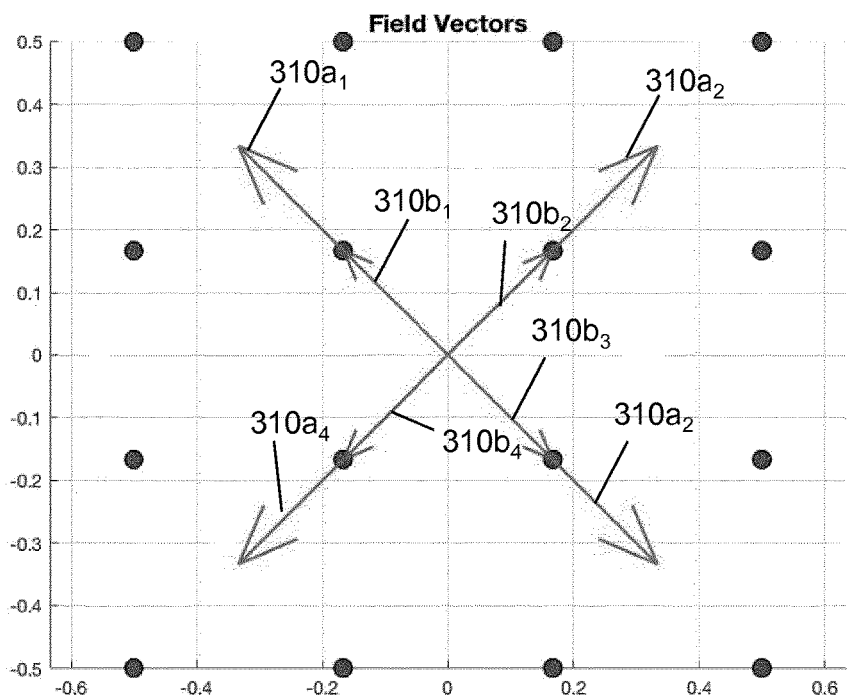
FIG. 3B shows a constellation diagram for the device in FIG. 3A.

Again, the phase modulators 301a and 301b are driven by respective PAM-4 drivers 207a and 207b such that each is operable in four modulating states. As shown in FIG. 3B, the modulation states $310b_1$-$310b_4$ indicate the states which may be provided by whichever of the intermediate waveguides that received an optical signal with the lowest power. Modulation states $310a_1$-$310a_4$ may be provided by whichever of the intermediate waveguides that received an optical signal with the highest power. Each of the sixteen points of the constellation diagram can be used by a set combination of outputs from the first and second intermediate waveguide. It should be noted that, in this example, the centre point of the constellation should remain at the origin regardless of non-idealities in the modulators, drivers, or couplers, and therefore it should not be necessary to include a DC phase shifting intermediate waveguide.

Figure 4A:
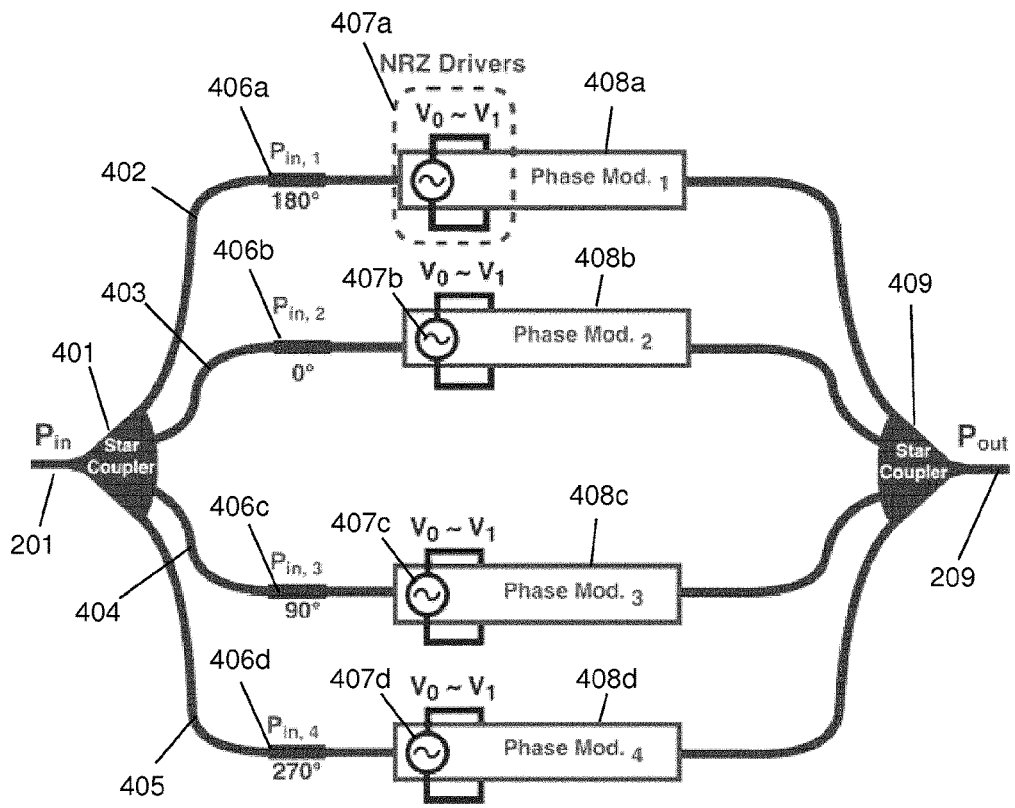
FIG. 4A shows a variant device for QAM-16 modulation.

FIG. 4A shows a further variant device according to the present invention. Here, the input waveguide 201 is connected to a 1×4 star coupler 401. It should be noted that the star coupler could be replaced by a multi-mode interference coupler, which is configured to produce a 1:2:1:2 splitting or coupling ratio. The star coupler 401 splits the incoming optical signal between four intermediate waveguides: first intermediate waveguide 402; second intermediate waveguide 403; third intermediate waveguide 404; and fourth intermediate waveguide 405. Each of the intermediate waveguides includes a DC phase shifter as per previous examples. However, in this instance, phase modulators 406a-406d are connected to non-return-to-zero drivers 407a-407b which are substantially identical. Therefore each modulator is operable in two modulating states, and can modulate the phase of the light passing therethrough between either 0° or 180°.

The star coupler 401 splits or couples the incoming optical signal between the four intermediate waveguides according to the ratio: 1:2:2:1, such that the second 403 and third 404 intermediate waveguides each receive twice the optical power as compared to the signal received by the first 402 and fourth 405 intermediate waveguides. A static relative phase difference between the intermediate waveguides should be set as: 180°, 0°, 90°, and 270° such that the first and second intermediate waveguide are separated by 180° of phase and the third and fourth intermediate waveguides are separated by 180° of phase. However the first and third intermediate waveguides are separated by 90° of phase, and the second and fourth intermediate waveguides are also separated by 90° of phase.

Figure 4B:
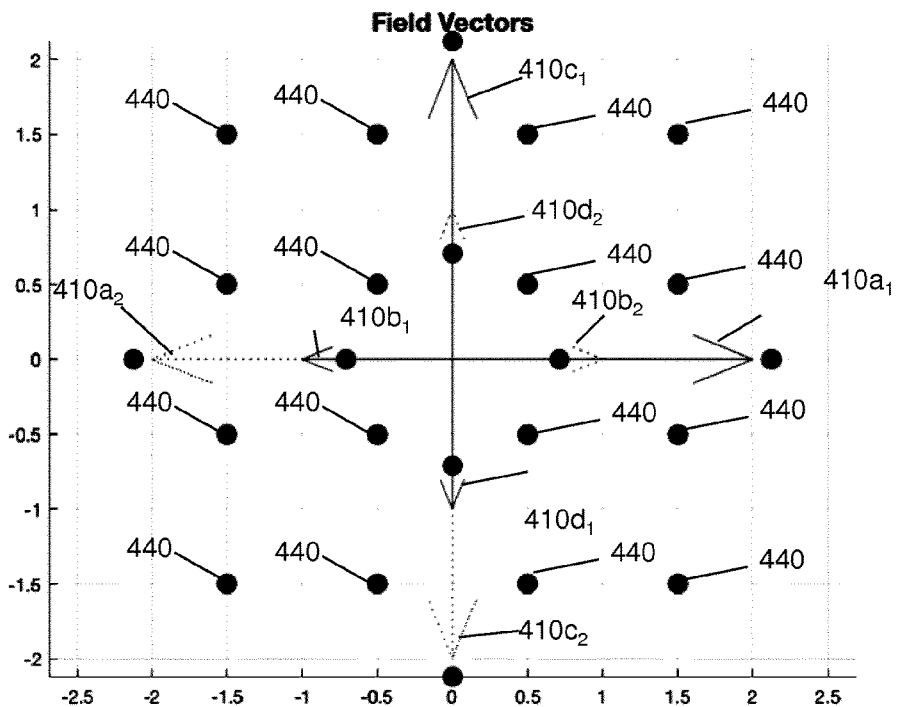
FIG. 4B shows a constellation diagram for the device in FIG. 4A.

A device as shown in FIG. 4A is able to produce the modulation states 440 shown in FIG. 4B. These are obtained by combining the modulation states of each of the four intermediate waveguides. The first intermediate waveguide 402, provides modulation states $410b_1$ and $410b_2$ which are generally the same in magnitude but with a 180° phase change. The second intermediate waveguide 403 provides modulation states $410a_1$ and $410a_2$ which are, again, generally the same in magnitude but with a 180° phase change. The third intermediate waveguide 404 provides modulation states $410c_1$ and $410c_2$, and the fourth intermediate waveguide 405 provides modulation states $410d_1$ and $410d_2$.

The centre point of the constellation, as shown in FIG. 4B, should remain at the origin when using the device shown in FIG. 4A. However, non-idealities in the phase modulator characteristics, electronic drivers, or the input/output couplers will result in a shift of the centre point and an additional intermediate waveguide may be necessary to bring the centre point of the constellation back to the centre (as has been discussed previously). In this case, the power and the phase of the additional intermediate waveguide would need to be adjusted accordingly and the input/output couplers would need to be modified to a 1×5 configuration with a corresponding adjustment to the splitting/coupling ratio.

Figure 5:
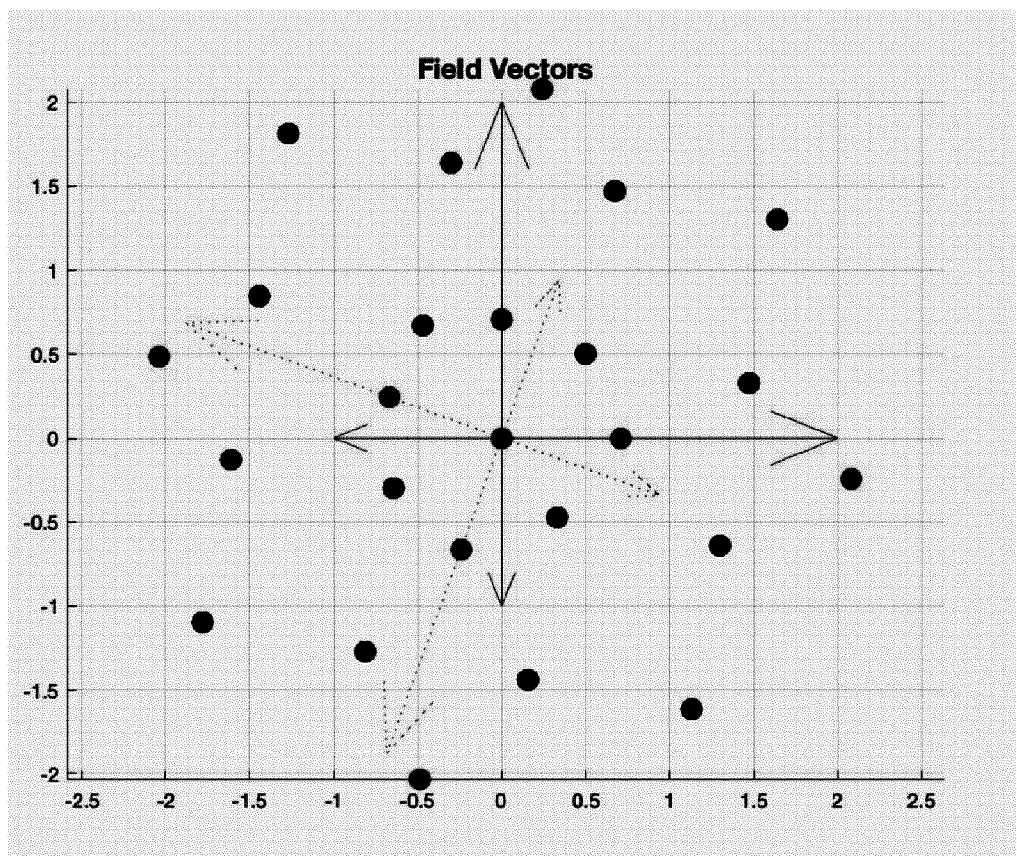
FIG. 5 shows a constellation diagram illustrating a non-ideality when using non-return-to-zero drivers.

FIG. 5 illustrates a constellation diagram corresponding to a device such as that shown in FIG. 4A, but where the modulators or drivers possess a non-ideality. In this example, the non-ideality has led to a phase modulation of less than 180° in each intermediate waveguide. Therefore the 16 constellation points have shrunk in total size relative to the example shown in FIG. 4B, and rotated around the inner-upper-right black point in a clockwise fashion.

Figure 6A:
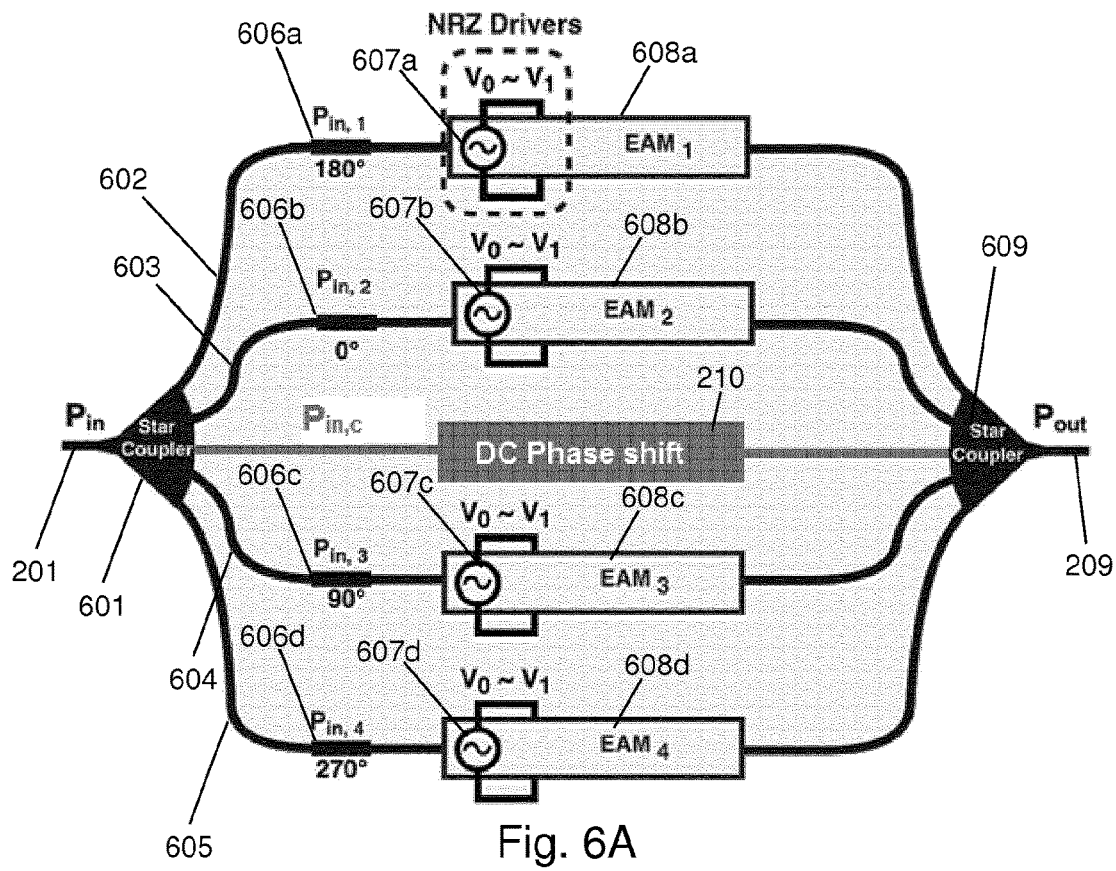
FIG. 6A shows a variant device for QAM-16 modulation.

FIG. 6A shows a further variant device according to the present invention. The input waveguide 201 provides an optical signal with power $P_{in}$ to a 1×5 input star coupler 601. It should be noted that the star coupler could be replaced by a multi-mode interference coupler, which is configured to produce a 1:2:2:1 splitting or coupling ratio. The input coupler in this example splits the light into four intermediate waveguides: a first 602, a second 603, a third 604, and a fourth 605. The input power is split between the intermediate waveguides at a ratio of 1:2:2:1, such that the optical power in two of the intermediate waveguides is twice the optical power in the other two intermediate waveguides. In this example, the input power into the second and third intermediate waveguides is twice the input power into the first and fourth intermediate waveguides. A static relative phase difference between the intermediate waveguides should be as described above, namely: 180°, 0°, 90°, and 270°.

Each of the intermediate waveguides of the device shown in FIG. 6A include DC phase shifters 606a-606d as described previously. They also all include an electro-absorption modulator 608a-608d respectively. The modulators should be substantially identical, and so have the same modulation characteristics e.g. length, extinction ratio, and chirp. Each modulator is driven by one of non-return-to-zero drivers 607a-607d. These drivers allow the respective modulator to operate in one of two modulation states. The star output coupler 609 recombines the optical signals from each of the intermediate waveguides and provides a combined modulated output from the device.

Figure 6B:
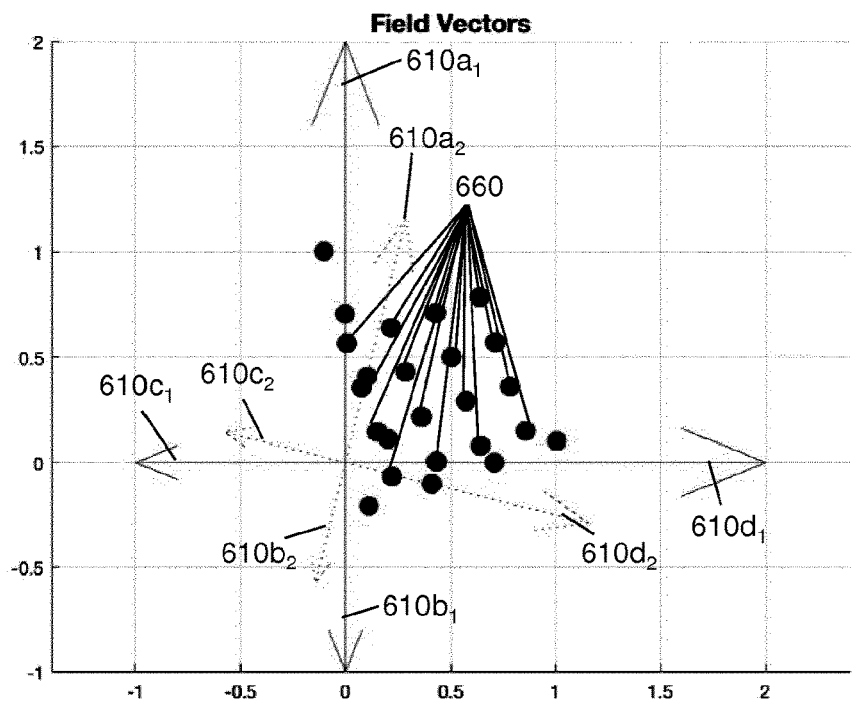
FIG. 6B shows a constellation diagram for the device in FIG. 6A.

A device as shown in FIG. 6A, but without the DC phase shifting intermediate waveguide 210, is able to produce the modulation states 660 shown in FIG. 6B. These are obtained by combining the modulation states of each of the four intermediate waveguides. The first intermediate waveguide 602, provides modulation states $610c_1$ and $610c_2$. Modulation state $610c_1$ corresponds to a 0V signal applied by the driver, e.g. a modulation state where the amplitude of the signal present in the first intermediate waveguide is not modified. Modulation state $610c_2$ corresponds to a signal greater than 0V being applied by the driver, and so the amplitude of the modulation state is less than that of modulation state $610c_1$. Moreover, as the modulator 608a will unintentionally apply a phase shift (known as chirp), modulation state $610c_2$ is not aligned with modulation state $610c_1$. Similarly, second intermediate waveguide 603 is operable to provide modulation states $610d_1$ and $610d_2$. Third intermediate waveguide 604 is operable to provide modulation states $610a_1$ and $610a_2$, and fourth intermediate waveguide 605 is operable to provide modulation states $610b_1$ and $610b_2$.

As has been discussed previously, the constellation diagram has rotated due to the chirp introduced by the electro-absorption modulators. By using the DC phase shifting intermediate waveguide discussed it is possible to shift the constellation centre point back to the origin (0,0).

TABLE 1 discusses two examples of electro-absorption modulators usable with the present invention:

| Version | Standard | Aggressive |
| --- | --- | --- |
| Modulator Type | EAM | EAM |
| EAM Length | 41.5 μm | 78 μm |
| EAM extinction ratio | 4.5 dB | 8.48 dB |
| EAM ΔΦ | 0°, 14° | 0°, 26.3° |
| EAM Insertion Loss | 2.98 dB | 5.6 dB |
| Power Splitting Ratio | 1:2:0.78:2:1 | 1:2:0.5:2:1 |
| Driver Type | 4× Binary NRZ | 4× Binary NRZ |
| Total Driver Power consumption (50 Gbaud) | Approx. 140 mW | Approx. 260 mW |
| Optical Power Penalty | 23.27 dB | 21.62 dB |

Figure 7:
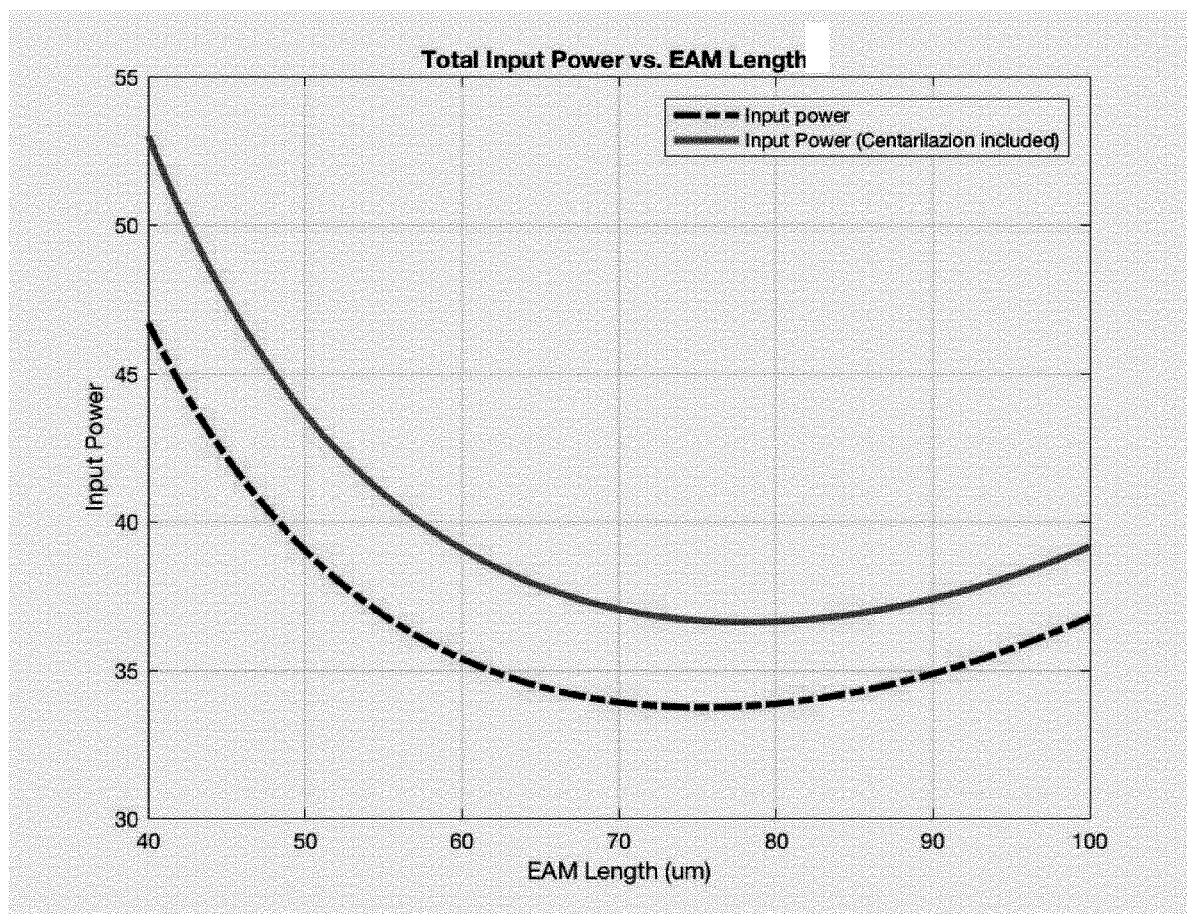
FIG. 7 is a plot showing the variation of in total input power vs modulator length.

FIG. 7 is a plot of representative input power against electro-absorption modulator length. It shows, for example, that when providing an EAM with a length of 41.5 μm an extinction ratio of 4.5 is possible (when centralization is included). Similarly, when an EAM with a length of 78 μm is used an extinction ratio of 8.48 is possible. It can be seen from the plot how much power is required for a given target constellation size (chosen based on the requirements of the device), using an EAM with a certain length (in the x axis). For example, in an illustrative example, to achieve the targeted constellation in FIG. 6B using an EAM with length 41.5 μm (and each EAM having an extinction ratio of 4.5 dB when modulated), will require around 50 mW of input power into the system. Similarly, it can be seen that an optimal length of the EAMs is around 78 μm, giving an extinction ratio of 8.48 dB each, which would require 37 mW of input power.

In general, increasing the EAM length improves the system since the extinction ratio associated with the EAM increases. However, the insertion loss also increases with length and there may be a trade-off that results in an optimum point which minimises the required input power.

Figure 8A:
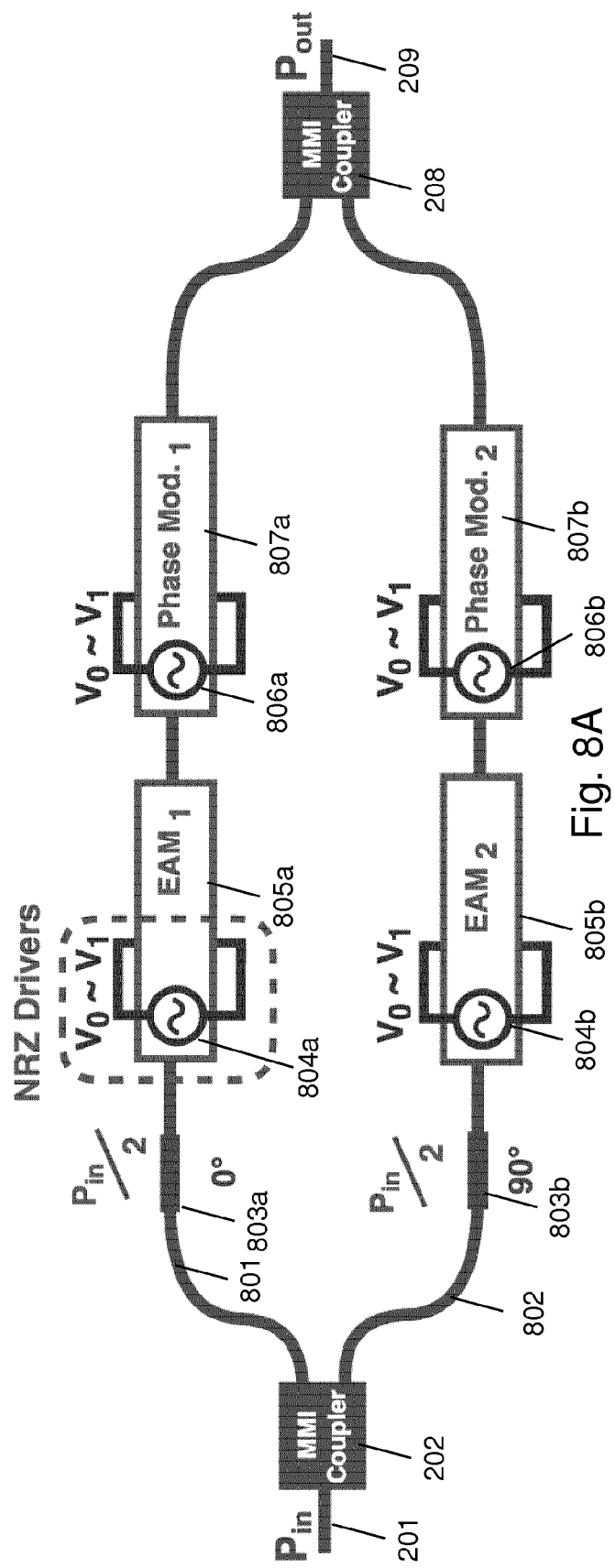
FIG. 8A shows a variant device for QAM-16 modulation.

FIG. 8A shows a further variant device according to the present invention. It shares a number of features with the device shown in FIG. 2A, and so like features are indicated by like reference numerals.

The first intermediate waveguide 801 of this device includes, disposed along its length, a DC phase shifter 803a, followed by an electro-absorption modulator 805a, and finally a phase modulator 807a. The electro-absorption modulator and phase modulator are driven by respective non-return-to-zero (NRZ) drivers 804a and 808a. Therefore, an optical signal provided to the first intermediate waveguide 801 via the coupler 202 may be modulated in both amplitude and phase by a single intermediate waveguide. The second intermediate waveguide 802 similarly includes a DC phase shiftier 803b, electro-absorption modulator 805b, and phase modulator 807b. Whilst these examples show the EAM and phase modulators arranged with the phase modulator after the EAM, it is of course possible to reverse this order.

The phase modulators 807a and 807b should be operable to modulate the phase of light passing therethrough between the states of 0° and 180° relative phase difference. The EAMs 805a and 805b should be operable to generate an extinction ratio of 20×log(3/1)=9.54 dB with zero chirp so as to provide equally spaced constellation points. The right length for the EAM should be chosen so as to avoid high insertion losses. One method for compensating for EAM chirp is to segment the respective phase modulator into a main segment and a smaller secondary segment, and use the smaller secondary segment to correct the phase change induced by the EAM. This would require a second smaller electronic binary NRZ driver for the smaller secondary segment of the phase modulator.

The input coupler 201 and output coupler 208 may be a 3-dB coupler. A static relative phase difference between the two intermediate waveguides should be set at 90°. As noted before, non-idealities in the phase modulators or EAMs may cause the centre point of a constellation corresponding to the output of the device to shift and rotate. If so, an additional DC phase shifting intermediate waveguide may be introduced as discussed previously. If such an intermediate waveguide is introduced, the input and output couplers should be modified to a 1×3 configuration with the appropriate splitting/coupling ratios.

Figure 8B:
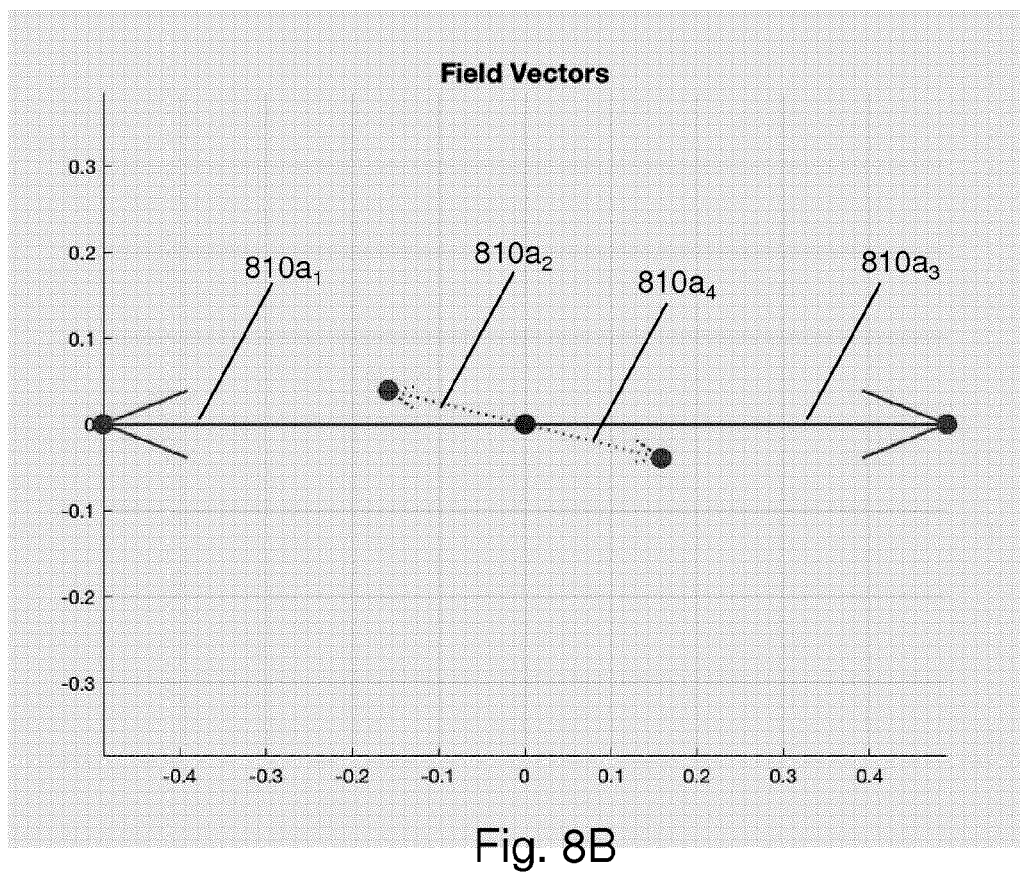
FIG. 8B shows a constellation diagram for the device in FIG. 8A.

FIG. 8B shows a constellation diagram indicating the possible modulation states of one of the intermediate waveguides. Modulation state 810a$_1$ is achieved by modulating neither amplitude nor phase. Modulation state 810a$_2$ is achieved by modulating only the amplitude of the light passing through the respective intermediate waveguide. Modulation state 810a$_3$ is achieved by modulating only the phase of the light passing therethrough, and modulating state 810a$_4$ is achieved by modulating both the amplitude and the phase of the light. It should be noted in this diagram, that the chirp incurred by the EAMs is not corrected for, and so modulation states 810a$_2$ and 810a$_4$ are not aligned with 810a$_1$ and 810a$_3$ respectively.

Similar behaviour occurs in the other of the two intermediate waveguides, whilst statically rotated by 90°, to thereby provide 16 constellation points at the output coupler. In this example, an extinction ratio of 9.54 dB and an arbitrary chirp of 14° is assumed for the EAMs.

Figure 9:
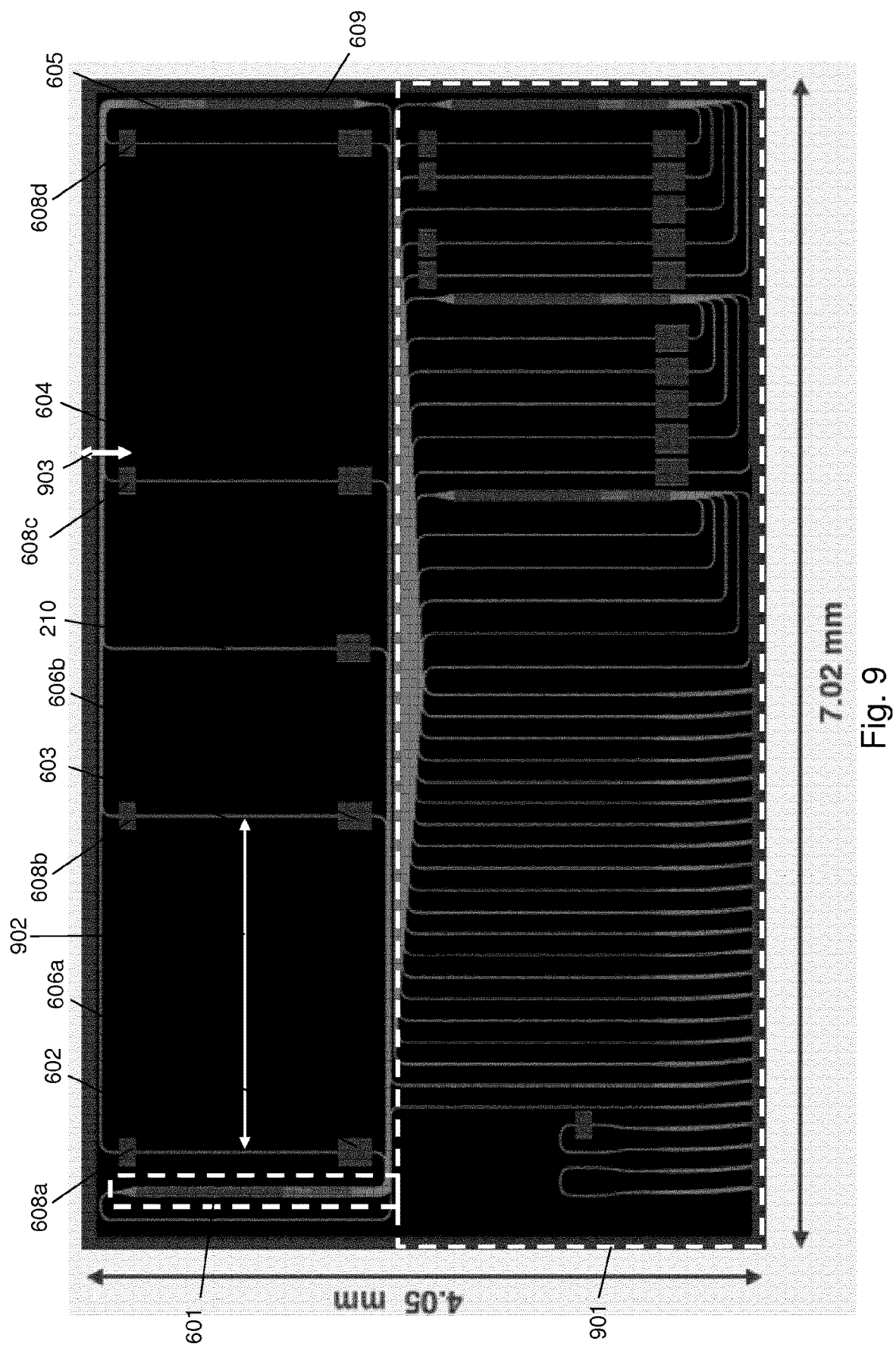
FIG. 9 shows a top-down plan view of a chip layout including a device for QAM-16 modulation.

FIG. 9 shows an example chip layout incorporating a device as shown in FIG. 6A. Like features are indicated by like reference numerals. A pitch 902, between adjacent waveguides containing modulating components is around 2 mm and a distance 903 of each modulating component from an edge of the chip is around 271 μm and may be around 254 μm. The lower portion 901 of the chip is given over to testing structures.

Figure 10:
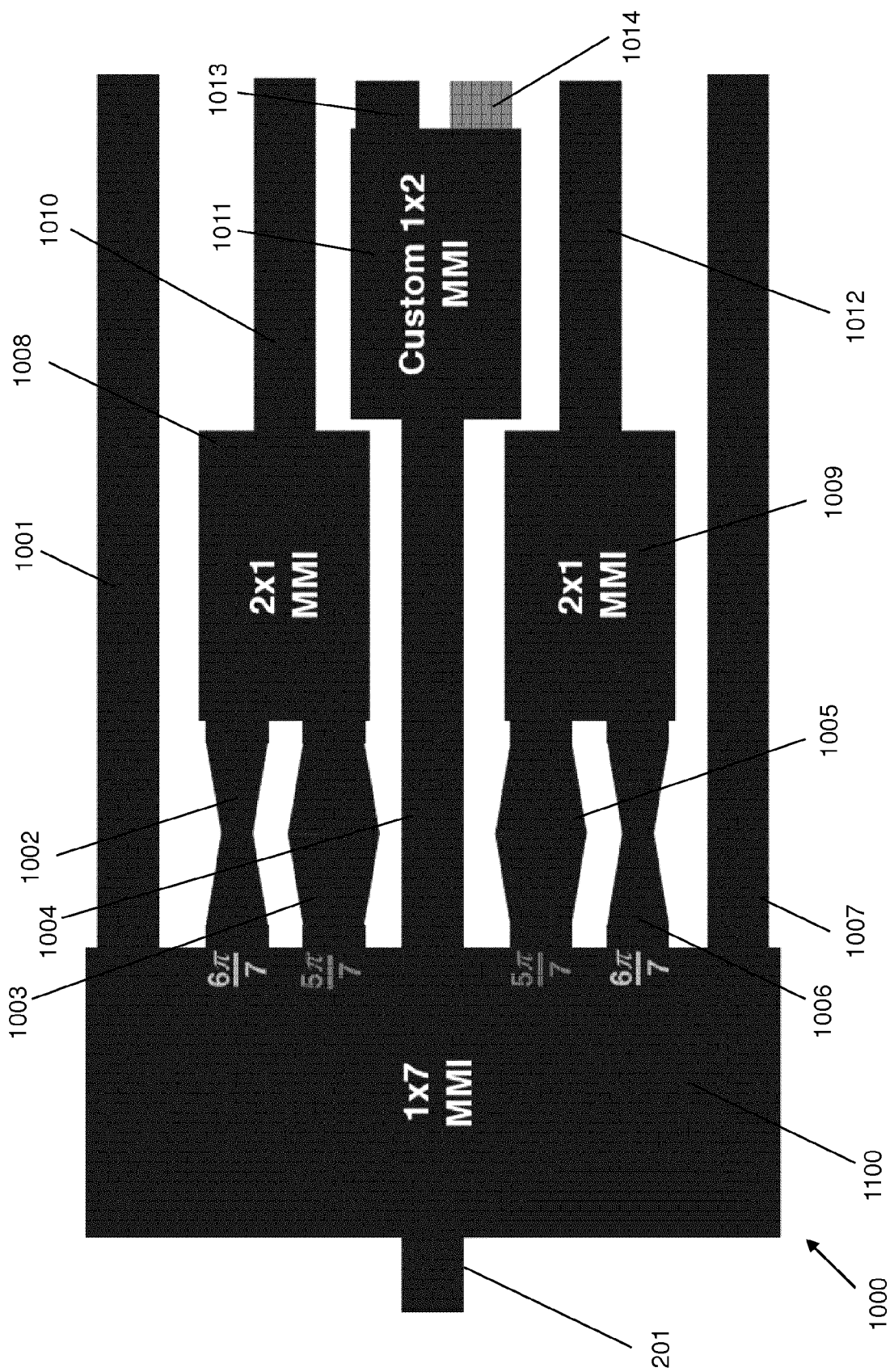
FIG. 10 shows a schematic view of an optimised coupler.
Figure 11:
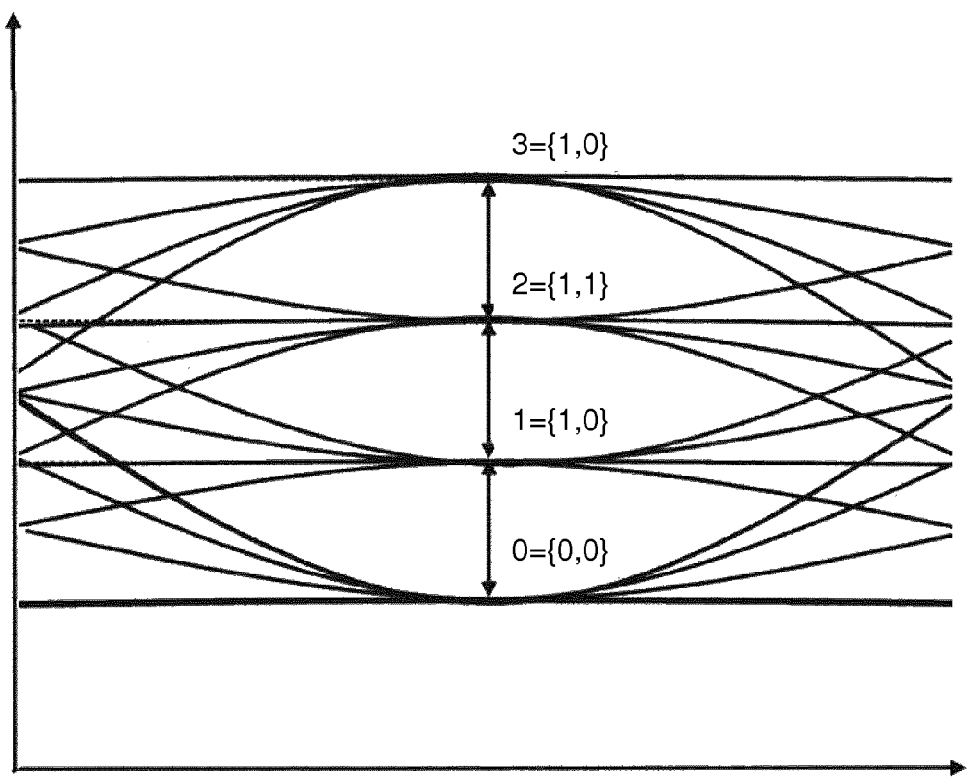
FIG. 11 shows a plot of signal (in normalised units) against time.

FIG. 10 shows an optimized coupler which forms a part of this disclosure. The coupler 1000 shown may be provided as an implementation of either the input or output coupler (or both) where the device has more than two intermediate waveguides. In an example where the optimized coupler is an input coupler, it is connected at one end to the input waveguide 201 discussed above. The input waveguide 201 connects to a 1×7 multi-mode interference portion 1100, which divides light between seven channels. Two pairs of the channels: 1002 and 1003, and 1005 and 1006, are combined so that the coupler is a 1×5 coupler. However, the portions of light arriving at channels 1002 and 1003 are out of phase by $$\frac{\pi}{7},$$

as they have respectively experienced relative phase shifts of:

$$\frac{6\pi}{7} \text{ and } \frac{5\pi}{7}.$$

Similarly, the portions of light arriving channels 1005 and 1006 are also out of phase by $$\frac{\pi}{7},$$

as they have respectively experienced relative phase shifts of $$\frac{5\pi}{7} \text{ and } \frac{6\pi}{7}.$$

Therefore, if left unmodified, when the portions of light recombined in 2×1 MMIs 1008 and 1009, the phase mismatch would cause significant losses. In order to rectify this, channels 1002, 1003, 1005, and 1006 have widths which taper in a direction parallel to the guiding direction of the channel. In channels 1002 and 1006, the width of the channel initially decreases before increasing after a midpoint in the channel. Whereas, the width of channels 1003 and 1005 initially increase before decreasing after a midpoint of the channel. Tapered channels such as these can be engineered in order to remove any relative phase shift between respective pairs of channels. Each pair of channels connects to a 2×1 MMI, which provides output channels 1010 and 1012 of the coupler.

The remaining three channels: 1001, 1004, and 1007 are not combined and so there are no issues regarding phase mismatch. These channels therefore correspond to further output channels of the coupler. Each of channels 1001, 1010, 1013, 1012, and 1007 are connected to a respective intermediate waveguide. In channel 1004, a custom 1×2 MMI 1011 is provided, an output channel 1013 is provided from the splitter and in this example is connected to the DC phase shifting intermediate waveguide. A channel 1014 is connected to the MMI but receives no output from the splitter. In examples where the EAM length is 41.5 μm, a final splitting/coupling ration of 1:2:0.78:2:1 may be needed.

The output of the first 1×7 MMI is 1:1:1:1:1:1:1 and after phase correction and combinations of the inner waveguides, before the last custom 1×2 MMI, the splitting ratio may be 1:2:1:2:1. The middle arm may be decreased from 1 to 0.78 and that is the role of the last custom 1×2 MMI. This last 1×2 MMI may be custom designed to provide a 0.78 portion of the input light. The other output of it (0.22 portion which corresponds to the output number 1014) is not used in the system (i.e. it is "thrown away" when the whole thing is used as a splitter or has a zero input light to it when used as a coupler). In the case of the splitter when the 0.22 portion is discarded, it is ensured that this portion will not reflect back to the splitter to distort the performance.

Other techniques can be used to achieve a 1:2:0.78:2:1 (or in general 1:2:x:2:1) splitting/coupling ratios, such as a custom designed 1×5 star coupler by engineering the output waveguide widths and positions. However, MMI couplers may have clean outputs and perform better and more robust through process variations.

If the output coupler is implemented according to the optimized coupler above, the ordering is reversed i.e. it will receive light into each of channels 1001, 1010, 1013, 1012, and 1007 and provide light out of output waveguide 209.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

LIST OF FEATURES

Figure 12:
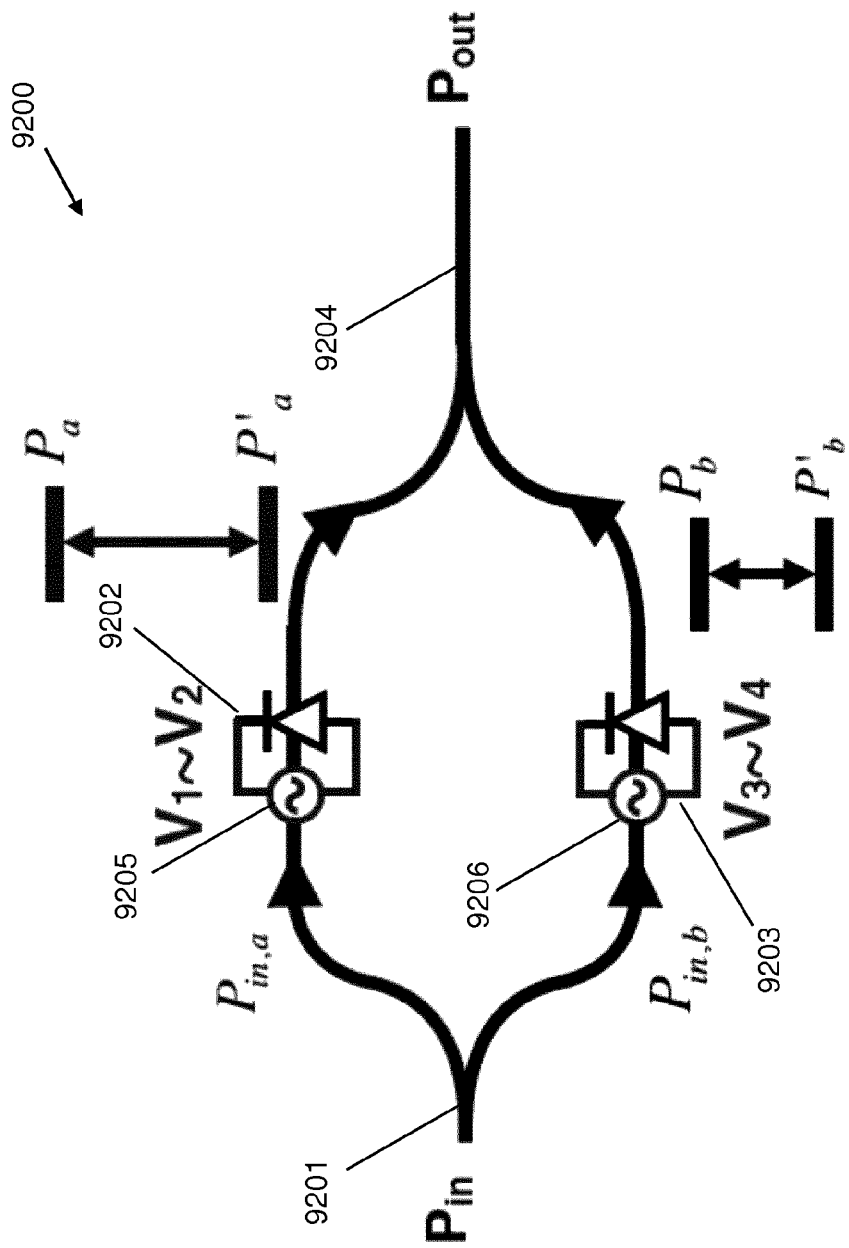
FIG. 12 shows an optical device.

101 Constellation point
102 Centre of constellation
201 Input waveguide
202 MMI input coupler
203 First intermediate waveguide
204 Second intermediate waveguide
205 DC phase shifter
206 EAM
207 PAM-4 driver
208 MMI output coupler
209 Output waveguide
210 DC phase shifter
211 16-point constellation
212 Outputs from first intermediate waveguide
213 Outputs from second intermediate waveguide
301 MMI input coupler
302 Phase modulator
310 Outputs from first intermediate waveguide
311 Outputs from second intermediate waveguide
401 Star input coupler
402 First intermediate waveguide
403 Second intermediate waveguide
404 Third intermediate waveguide
405 Fourth intermediate waveguide
406*a-d* DC phase shifters
407*a-d* NRZ drivers
408*a-d* Phase modulators
409 Star output coupler
410$n_i$ Modulation state
440 Constellation points
601 Star input coupler
602 First intermediate waveguide
603 Second intermediate waveguide
604 Third intermediate waveguide
605 Fourth intermediate waveguide
606*a-d* DC phase shifters
607*a-d* NRZ drivers
608*a-d* Electro-absorption modulators
609 Star output coupler
610$n_i$ Modulation state
660 Constellation points
801 First intermediate waveguide
802 Second intermediate waveguide
803*a/b* DC Phase shifter
804*a/b* NRZ driver for EAM
805*a/b* Electro-absorption modulator
808*a/b* NRZ driver for phase modulator
807*a/b* Phase modulator
810$n_i$ Modulation state
901 Test area
902 Pitch
903 Distance from edge of chip
1000 Optimized coupler
1001-14 Channels
1100 1×7 MMI
1008, 1009 2×1 MMI
1011 Customised 1×2 MMI FIG. 12 shows an optical device 9200, which broadly comprises: an input waveguide 9201, a first electro-absorption modulator 9202, a second electro-absorption modulator 9203, and an output waveguide 9204. Light enters the input waveguide, and has a power $P_{in}$. This is then divided between the first and second electro-absorption modulators, as they are disposed in different optical paths of the device. The first electro-absorption modulator receives $P_{in,a}$, and the second electro-absorption modulator receives $P_{in,b}$. The modulators are driven, respectively, by AC sources 9205 and 9206 at voltages $V_1$, $V_2$, $V_3$, or $V_4$. Light then exits via output waveguide 9204, having an associated power $P_{out}$.

The first electro-absorption modulator 9202 is operable to produce an output with either a first $P_a$ or second $P'_a$, power level. As shown in FIG. 12, the second power level is less than the first power level. Similarly, the second electro-absorption modulator is operable to produce an output with either a third $P_b$ or second $P'_b$ power level. This allows PAM-4 modulation, as at least four amplitudes are available from the device.

Figure 13:
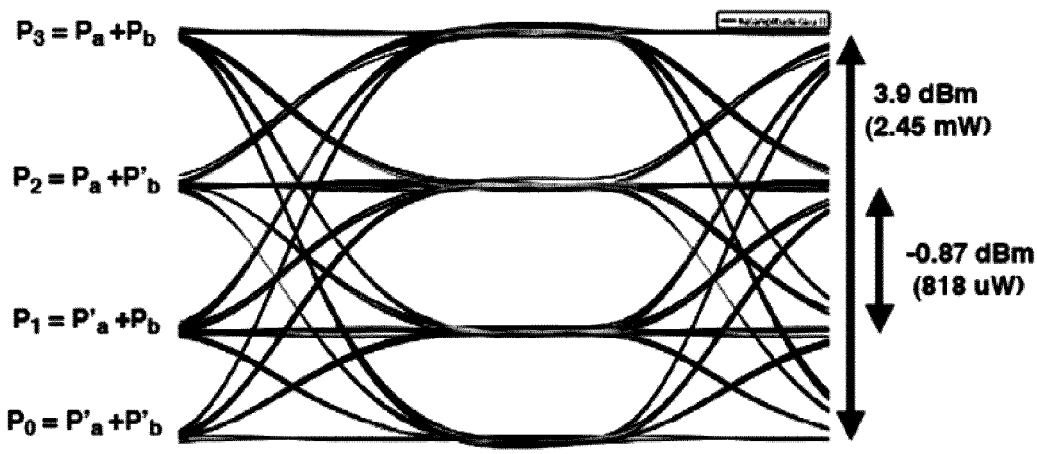
FIG. 13 shows a plot of signal against time for the optical device shown in FIG. 12.
Figure 14A:
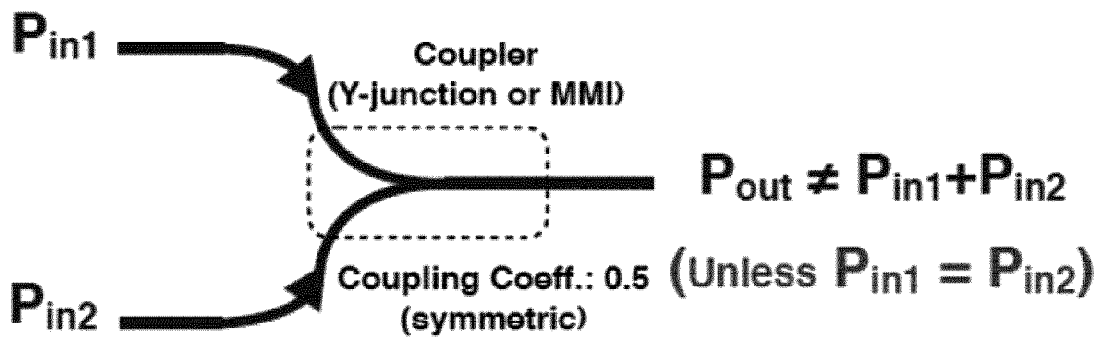
FIGS. 14A and 14B show, respectively, the behaviour of a coupler of the optical device of FIG. 12.
Figure 14B:
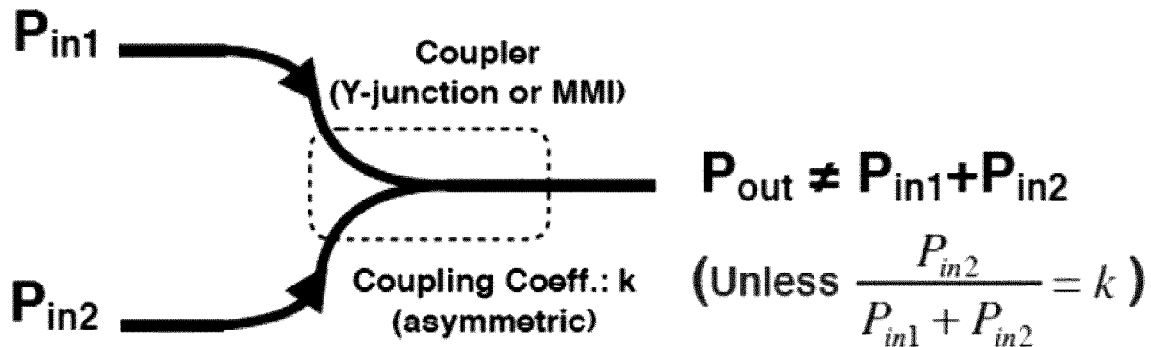

FIG. 13 shows the outputs available from a device as discussed above. The lowest output in power output, $P_0$ is formed by a combination of $P'_a$ and $P'_b$. The next output, increasing in power, $P_1$, is formed by a combination of $P'_a$, and $P_b$. Next, $P_2$ is formed by a combination of $P_a$ and $P'_b$. Finally, $P_3$, with the highest output power is formed by a combination of $P_a$ and $P_b$. The difference, $\Delta P_{(0,3)}$, between $P_0$ and $P_3$ is around 3.9 dBm (or 2.45 mW). Whereas a difference $\Delta P_{1,2}$, between $P_1$ and $P_2$ is around −0.87 dBm (or 818 μW).

The combined output power, as well as individual powers generated by each of the first and second electro-absorption modulators, can be calculated as follows:

$$OMA_{total} = P_3 - P_0 = 2.45 \text{ mW} \qquad P_3 = 3.58 \text{ mW}$$

$$ER = 10\log\left(\frac{P_3}{P_0}\right) = 5 \qquad \Rightarrow P_2 = 2.77 \text{ mW}$$

$$P_{i+1} - P_i = \frac{OMA_{total}}{3} = 817 \text{ μW} \qquad P_1 = 1.95 \text{ mW}$$

$$P_0 = 1.13 \text{ mW}$$

where $OMA_{total}$ is the total optical modulation amplitude of the PAM-4 signal and ER is the extinction ratio. These four output power levels, $P_3$, $P_2$, $P_1$, and $P_0$ should be generated by the power combination of the two arms of the device (i.e. the two electro-absorption modulators). However, it may be important to consider whether the output powers of the electro-absorption modulators add linearly to generate the final output power levels. The field vectors of the each output power may be summed to provide the total output power. Therefore, for a symmetric coupler, the total output power may be described by:

$$P_{out} = \left| \frac{1}{\sqrt{2}} \sqrt{P_{in1}} \, e^{i\theta_1} + \frac{1}{\sqrt{2}} \sqrt{P_{in2}} \, e^{j\theta_2} \right|^2 \quad (1)$$

Or $$P_{out} = \left| \frac{1}{\sqrt{2}} \sqrt{P_{in1}} + \frac{1}{\sqrt{2}} \sqrt{P_{in2}} \right|^2 \quad (2)$$

Equation (1) is used where there is a phase difference between the light output from the first electro-absorption modulator and the light output from the second electro-absorption modulator. Equation (2) is used where there is no phase difference.

It is noted that, in this example, even when there is zero phase difference the output power of the device is not a linear addition of the respective output powers of the electro-absorption modulators.

The total output power may be described by:

$$P_{out} = \left| \sqrt{(1-k)P_{in1}} \, e^{i\theta_1} + \sqrt{(k)P_{in2}} \, e^{j\theta_2} \right|^2 \quad (3)$$

Or $$P_{out} = \left| \sqrt{(1-k)P_{in1}} + \sqrt{(k)P_{in2}} \right|^2 \quad (4)$$

Where k is the coupler coefficient.

Equation (3) is used where there is a phase difference between the light output from the first electro-absorption modulator and the light output from the second electro-absorption modulator. Equation (4) is used where there is no phase difference. Equations (3) and (4) are generally true for any value of k where 0<k<1. In examples where the output power $P_{out}$ is equal to $P_{in1}+P_{in2}$, k may be set to equal $$\frac{P_{in2}}{P_{in1} + P_{in2}}$$

In this example. the equations describing the generation of the 4 output levels of the device would be as follows:

$\sqrt{(1-k)P_a} + \sqrt{kP_b} = \sqrt{P_3}$ $\sqrt{(1-k)P_a} + \sqrt{kP'_b} = \sqrt{P_2}$ $\sqrt{(1-k)P'_a} + \sqrt{kP_b} = \sqrt{P_1}$ $\sqrt{(1-k)P'_a} + \sqrt{kP'_b} = \sqrt{P_0}$ This can be considered as a set of 4 non-linear equations, with 5 unknowns: $P_a$, $P'_a$, $P_b$, $P'_b$, and k. However, the equations can be manipulated and rewritten in the following form:

$a+b=\sqrt{P_3}$ $a+b'=\sqrt{P_2}$ $a'+b=\sqrt{P_1}$ $a'+b'=\sqrt{P_0}$

This forms a set of 4 linear equations with 4 unknowns. As the left-hand side of the this set of linear equations are dependent (i.e. a linear combination of 3 chosen equations can build the $4^{th}$), an associated matrix A to this system is singular (i.e. if the system above is written in the form Ax=b where x is the vector of unknowns, the 4-by-4 matrix A would have a rank of 3 rather than 4).

For this set of equations to have any solutions, it should be required that:

$\sqrt{P_1} + \sqrt{P_2} = \sqrt{P_0} + \sqrt{P_3}$

And as it is preferred that the output power levels be equally spaced, it should be stated that:

$P_1 + P_2 = P_0 + P_3$

It is preferred to calculate a set of values for a, b, a', and b' which minimises an error of the system described above. This can be formulated as a convex optimization problem, with several factors to consider minimising in this system.

Figure 15:
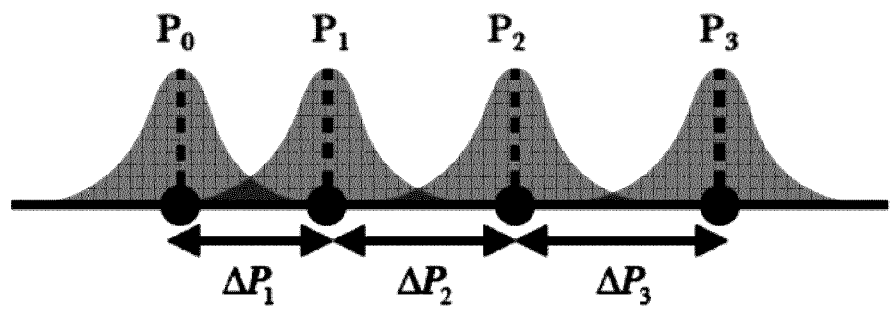
FIG. 15 shows a plot of PAM-4 transmission, together with Gaussian noise.

Therefore, set out below is a derivation of an equation for an unequally spaced PAM-4 bit-error-rate. The derivation assumes: that symbols are equally likely to be transmitted; any noise is Gaussian in form; and that the noise and its power is independent from the optical signal. FIG. 15 is a demonstration of a PAM-4 transmission which includes Gaussian noise.

The symbol error rate may be stated as:

$$P_s = \frac{1}{2}\left[ Q\left(\sqrt{\frac{\Delta P_1}{2N_0}}\right) + Q\left(\sqrt{\frac{\Delta P_2}{2N_0}}\right) + Q\left(\sqrt{\frac{\Delta P}{2N_0}}\right) \right]$$

where $$Q(x) = \frac{1}{2\pi} \int_x^\infty e^{\frac{t^2}{2}} \, dt,$$

t is time, Q is a Q function, and $N_0$ is the Gaussian noise power in mW/Hz.

It can be noted that the dominant factor in affecting the bit-error-rate will be the smallest output level (i.e. $P_0$), as the changes in the Q function are steep as the argument goes beyond 7 to achieve a bit-error-rate of the order −12.

Therefore, the constraints that should be used in the optimizer result in solving the following problem:

System: $Ax = b$

Optimization $\min(|eye_3 - eye_2|^2)$ parameters: $\min(eye_2 - eye_1|^2)$ $\min(|eye_1 - eye_3|^2)$ Constraints: $eye_i \geq \dfrac{OMA_{outer}}{3}$ for $i = 1, 2, 3$ $$x = \begin{bmatrix} a \\ a' \\ b \\ b' \end{bmatrix}, \, b = \begin{bmatrix} \sqrt{P_3} \\ \sqrt{P_2} \\ \sqrt{P_1} \\ \sqrt{P_0} \end{bmatrix}, \, A = \begin{bmatrix} 1 & 1 & 0 & 0 \\ 1 & 0 & 1 & 0 \\ 0 & 1 & 1 & 0 \\ 0 & 1 & 0 & 1 \end{bmatrix}$$

Where eye refers to the output level for a particular level of PAM-4 modulation.

Figure 16:
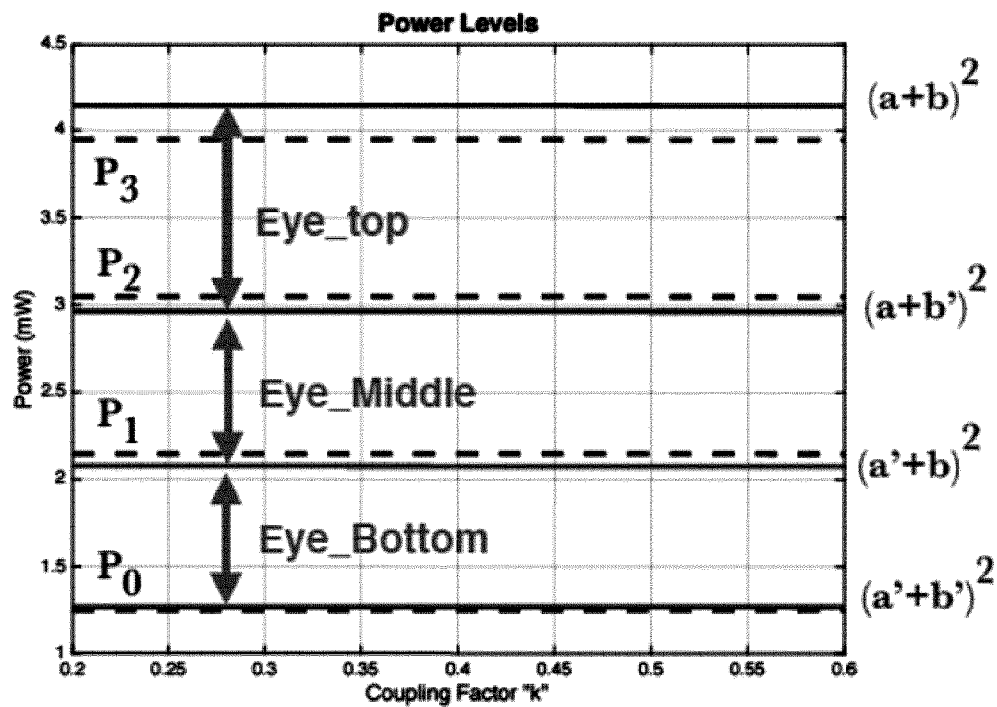
FIG. 16 shows a plot of power against coupling factor k.

The results of this optimization are shown in FIG. 16. The levels are unequally spaced, however the minimum output level is still larger than the minimum eye closure requirement.

The extinction ratios for each of the first and second electro-absorption modulators can therefore be calculated as:

$$a = \sqrt{(1-k)P_a}$$
$$a' = \sqrt{(1-k)P'_a} \Rightarrow ER_1 = 10\log\left(\left(\frac{a}{a'}\right)^2\right) = 6.33 \text{ dB}$$
$$b = \sqrt{(1-k)P_b}$$
$$b' = \sqrt{(1-k)P'_b} \Rightarrow ER_2 = 10\log\left(\left(\frac{b}{b'}\right)^2\right) = 3.49 \text{ dB}$$

Figure 17A:
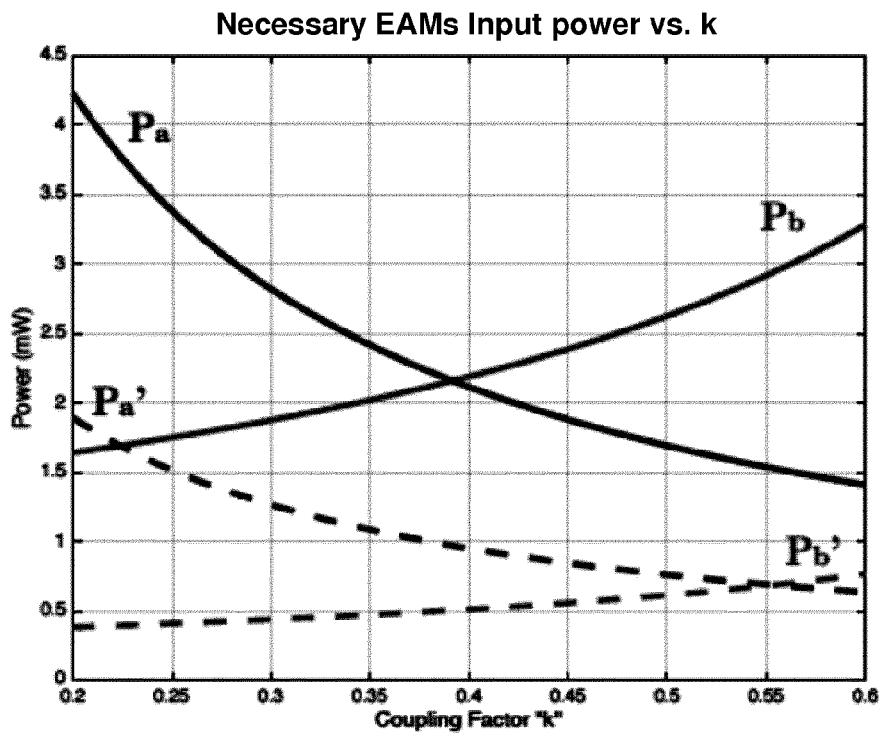
FIG. 17A shows a plot of EAM output power against coupling factor k.

It may be useful to determine the optimum coupling coefficient k to use in order to minimize the necessary input power to the device. The plot in FIG. 17A shows that by sweeping over k, it is possible to achieve different combinations of the first and second electro-absorption modulator output powers necessary for operation. From this data, and by considering the insertion loss from each modulator, the necessary input power to the first and second electro-absorption modulators and their sum (which is generally referred to as a measure for the total input power) can be derived as shown in FIG. 17B.

Figure 17B:
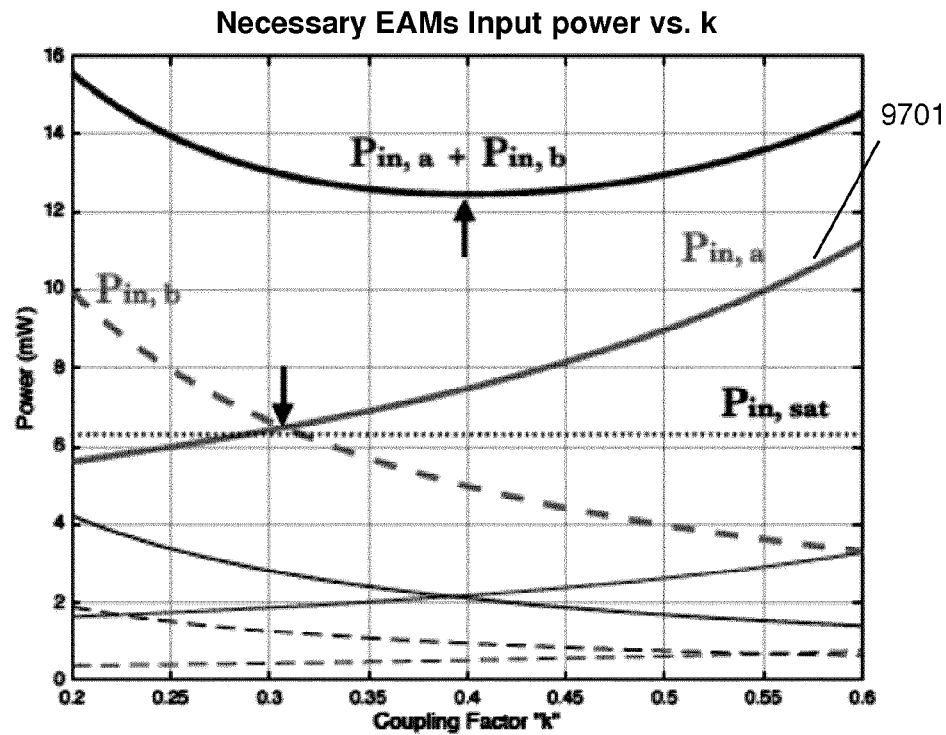
FIG. 17B shows a plot of EMA input power against coupling factor k.

One limit for input power may be that the input power to each of the first and second electro-absorption modulator respectively should not exceed +8 dBm (the line 9701 indicated in FIG. 17B). This limit results in the optimum value fork being around 0.39 (which would result in a minimisation of the necessary total input power). However, due to the saturation input power constraint, a value of k=0.3 is also considered.

Figure 18:
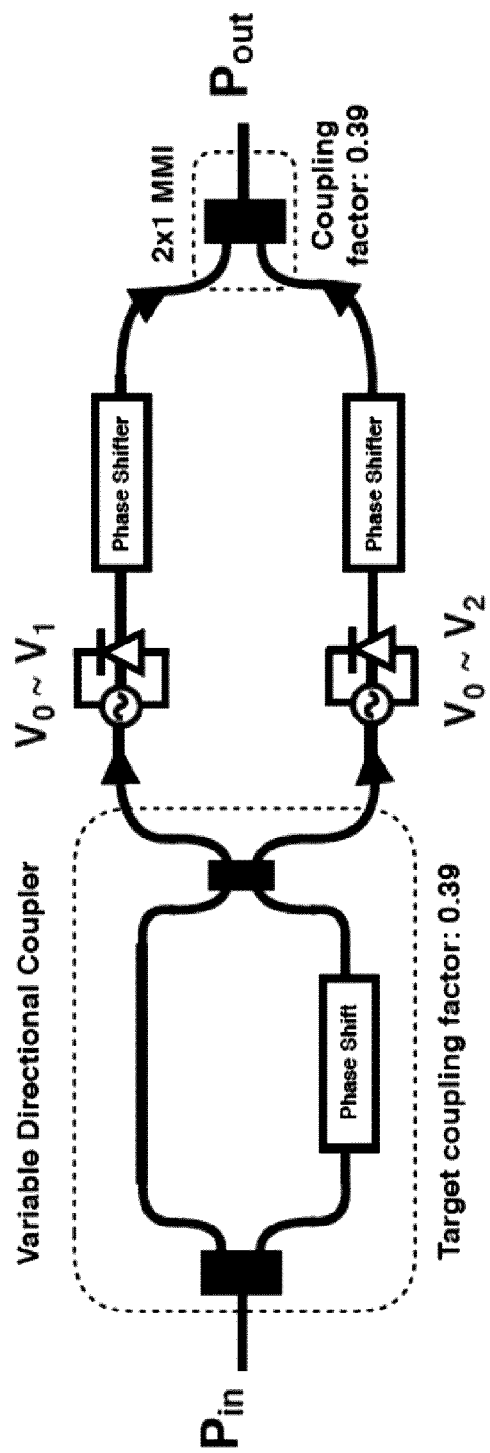
FIG. 18 shows a variant optical device.

When using multimode interference couplers for output coupler and input coupler, and assuming an excess loss of 0.1 dB for each, a propose circuit is shown in FIG. 18. The specifications for this circuit are discussed in tables 1 and 2 below:

TABLE 1

(where k = 0.39)

| Sections | EAM Lengths (μm) | ER (dB) | $P_{off}$ (mW) | $P_{on}$ (mW) | $P_{in}$ (mW) | Insertion Loss (dB) | Link penalty (dB) |
|---|---|---|---|---|---|---|---|
| Arm 1 | 66 | 6.33 | 2.18 | 0.51 | 7.45 | 5.34 | 6.49 |
| Arm 2 | 48 | 3.49 | 2.12 | 0.95 | 5.00 | 3.73 | 6.3 |
| Total | — | 4.95 | 4.26 | 1.36 | 12.46 | 4.66 | 6.33 |

TABLE 2

(where k = 0.3)

| Sections | EAM Lengths (μm) | ER (dB) | $P_{off}$ (mW) | $P_{on}$ (mW) | $P_{in}$ (mW) | Insertion Loss (dB) | Link penalty (dB) |
|---|---|---|---|---|---|---|---|
| Arm 1 | 66 | 6.33 | 1.9 | 0.44 | 6.49 | 5.34 | 6.49 |
| Arm 2 | 48 | 3.49 | 2.74 | 1.23 | 6.44 | 3.72 | 6.3 |
| Total | — | 4.95 | 4.26 | 1.36 | 12.94 | 4.82 | 6.49 |

Of particular note is that the devices discussed above require no digital to analogue converts in order to operate as PAM-N modulating device. All driver signals on the electro-absorption modulators may be the same, and the laser power into the device can be increase by 3 dB relative to a transmitter implemented with a single electro-absorption modulator or a series of modulators in a single waveguide.

Moreover, variable couples or tunable Mach-Zehnder interferometers can be used at the input and output of the device (i.e. coupled with the input waveguide and output waveguide respectively) to adjust the input and output split ratios. This can compensate for non-perfectly linearly separated layers generated at the output of the device due to the absorption of the electro-absorption modulators and/or the phase responses being different from different modulators.

Figure 19:
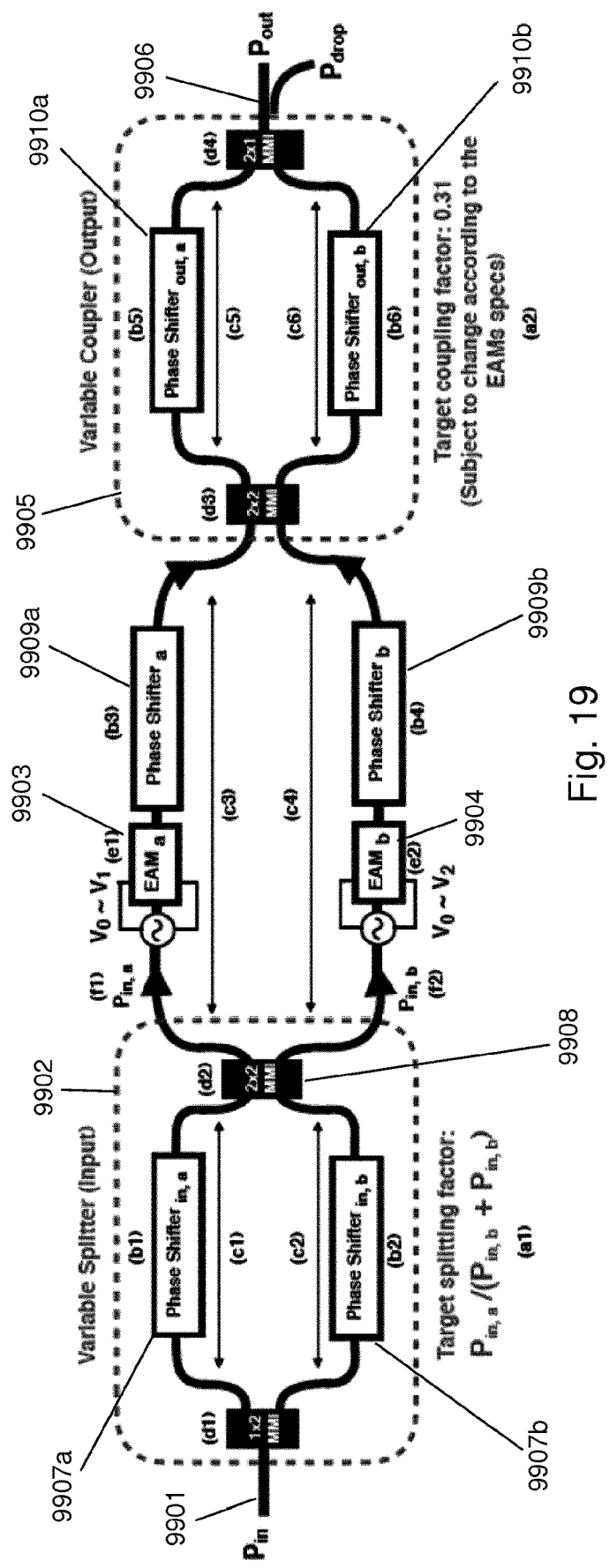
FIG. 19 shows a further variant optical device.

This is illustrated in FIG. 19, where a further variant device is illustrated. Broadly, the device includes: an input waveguide 9901, a variable input coupler 9902, a first electro-absorption modulator 9903 and a second electro-absorption modulator 9904, a variable output coupler 9905, and an output waveguide 9906.

The variable input coupler 9902 is formed of a Mach-Zehnder interferometer, having arms b1 and b2. A 1×2 multimode interference coupler splits the light received from the input waveguide 9901 into each of the arms. The first arm b1 includes a phase shifter 9907*a*, and the second arm b2 includes a phase shifter 9907*b*. The resulting light is combined in a further multimode interference coupler 9908, before being divided again into the first electro-absorption modulator 9903 and the second electro-absorption modulator 9904. The first and second electro-absorption modulators are disposed within arms of a second Mach-Zehnder interferometer, and have associated phase shifters 9909*a* and 9909*b*.

The light is then transmitted into the variable output coupler 9905, which is formed of a third Mach-Zehnder interferometer having arms b5 and b6. Each of the arms b5 and b6 include respective phase shifters 9910*a* and 9910*b*. The light in the variable output coupler 9905 is then recombined in a 2×1 multimode interference coupler, before exiting the device via output waveguide 9906.

In all of the Mach-Zehnder interferometers, there may be more than one phase shifter. The arms of the Mach-Zehnder interferometers are generally parallel. A tap 9911 is present in the variable output coupler that allows a feedback signal to be obtained to bias and stabilize the phase shifters present in the device.

Figure 20A:
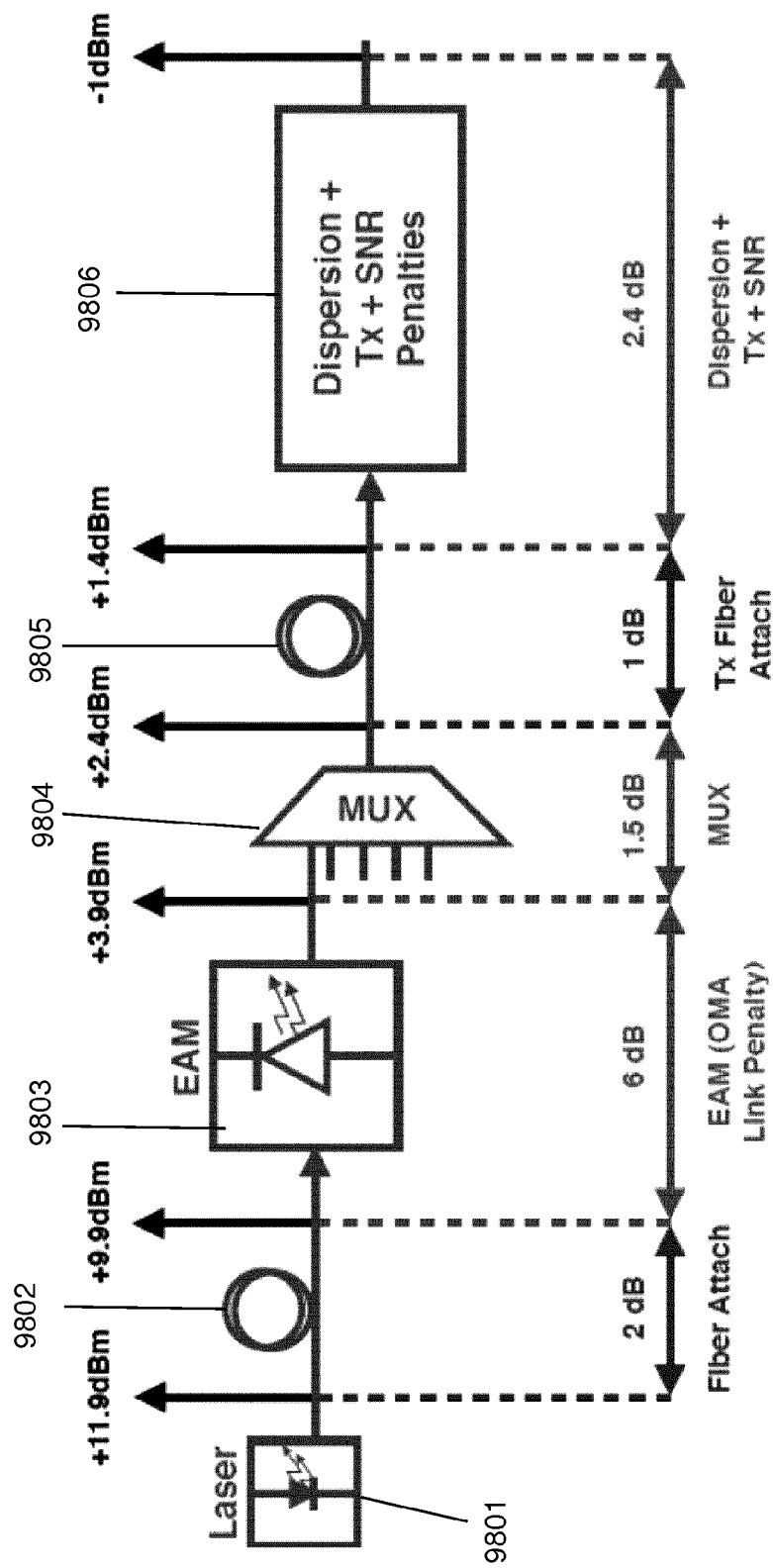
FIGS. 20A and 20B show a transmission system including the optical device of FIG. 12, FIG. 18, or FIG. 19.
Figure 20B:
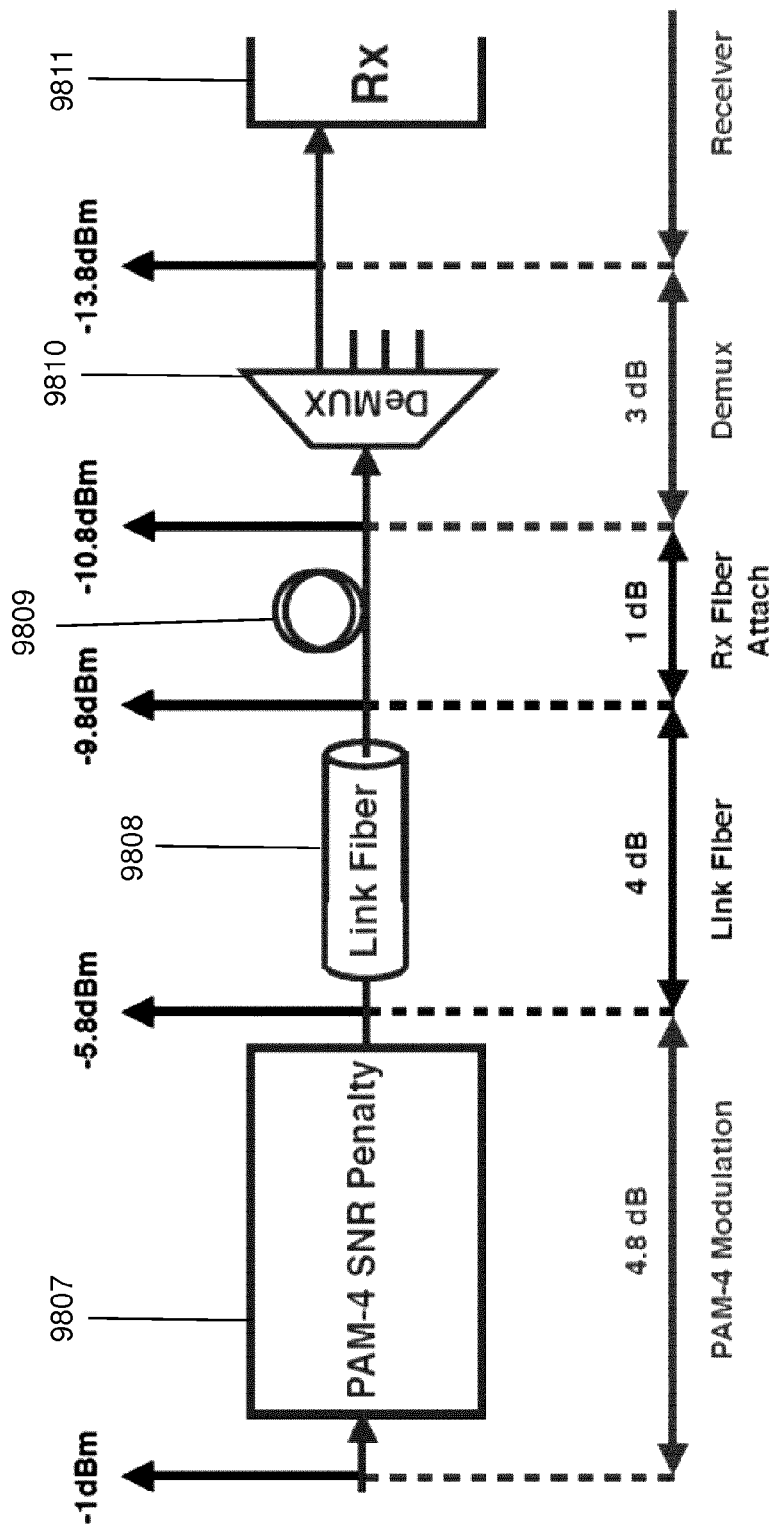
Figure 21:
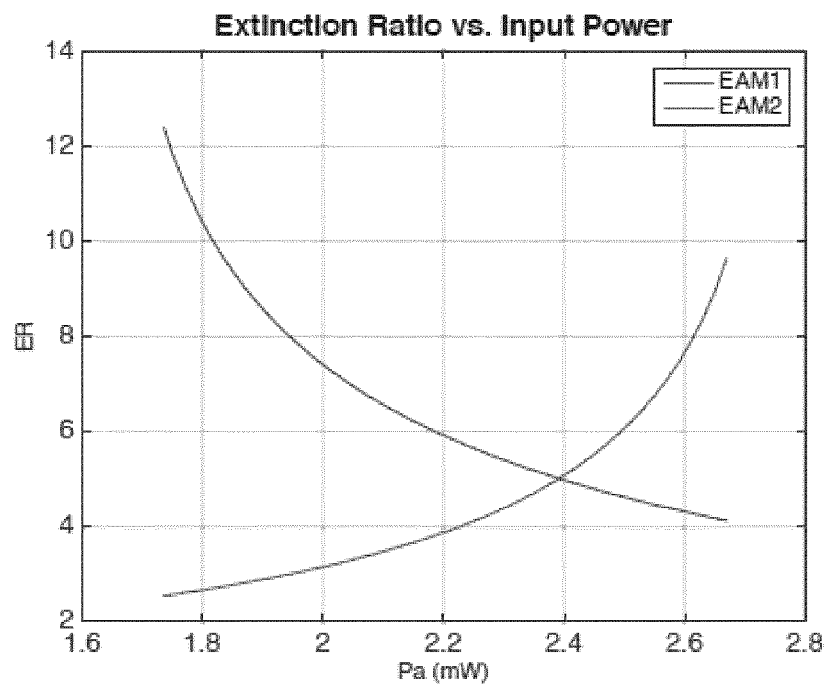
FIG. 21 shows a graph of extinction ratio vs. input power.
Figure 22:
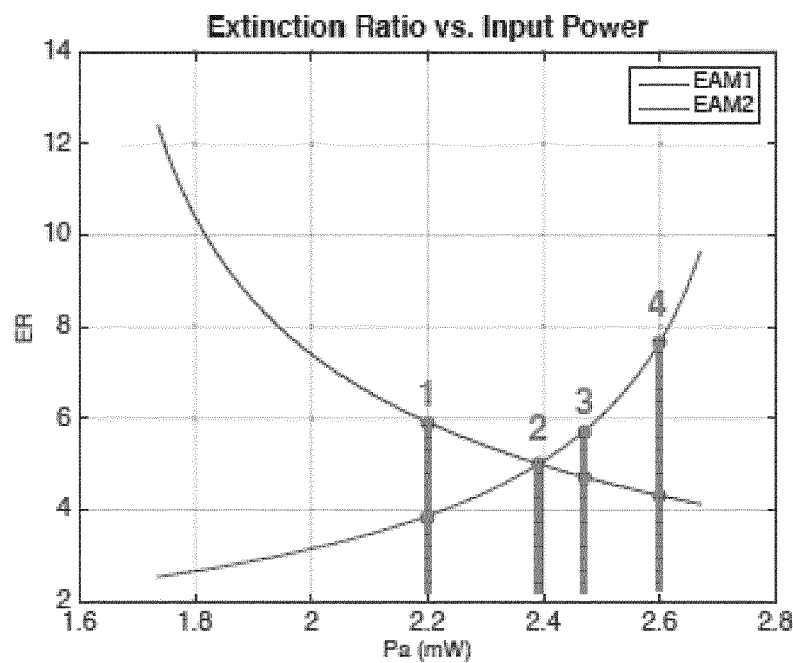
FIG. 22 shows a graph of extinction ratio vs. input power.
Figure 23:
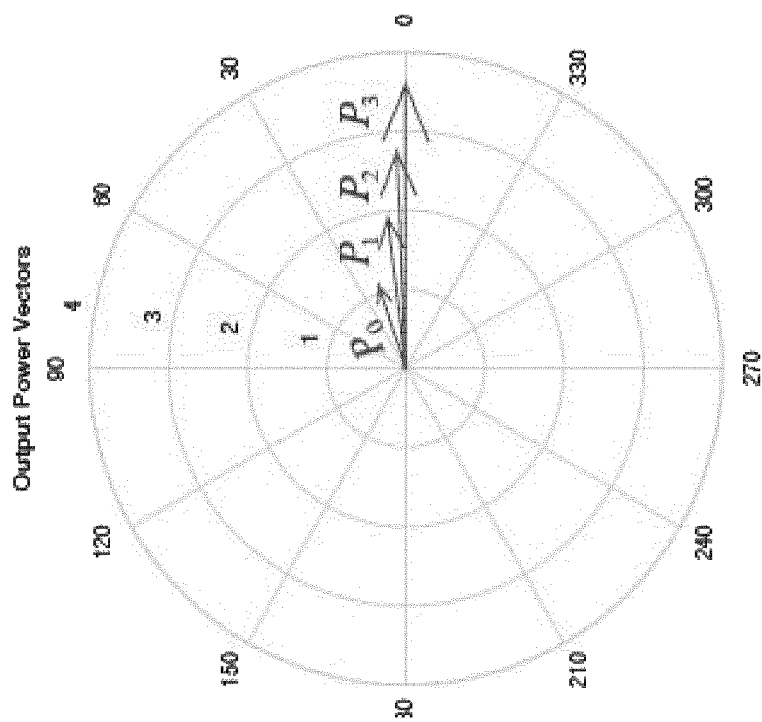
FIG. 23 shows a diagram of input power vectors and a diagram of output power vectors.
Figure 23:
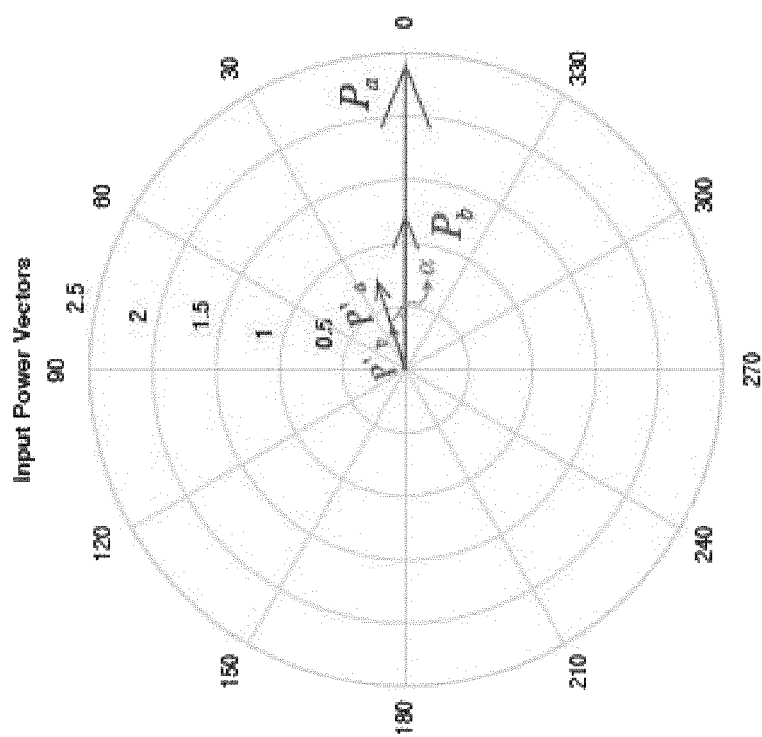
Figure 24:
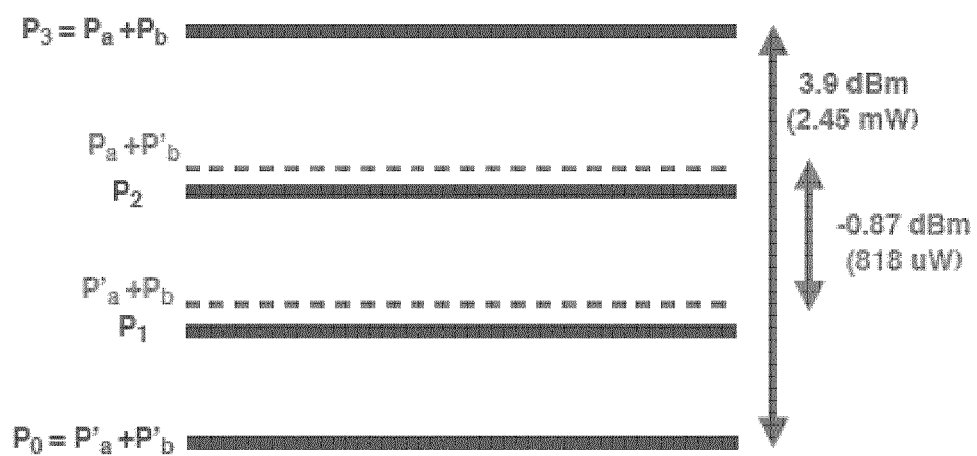
FIG. 24 shows a power level diagram.
Figure 25:
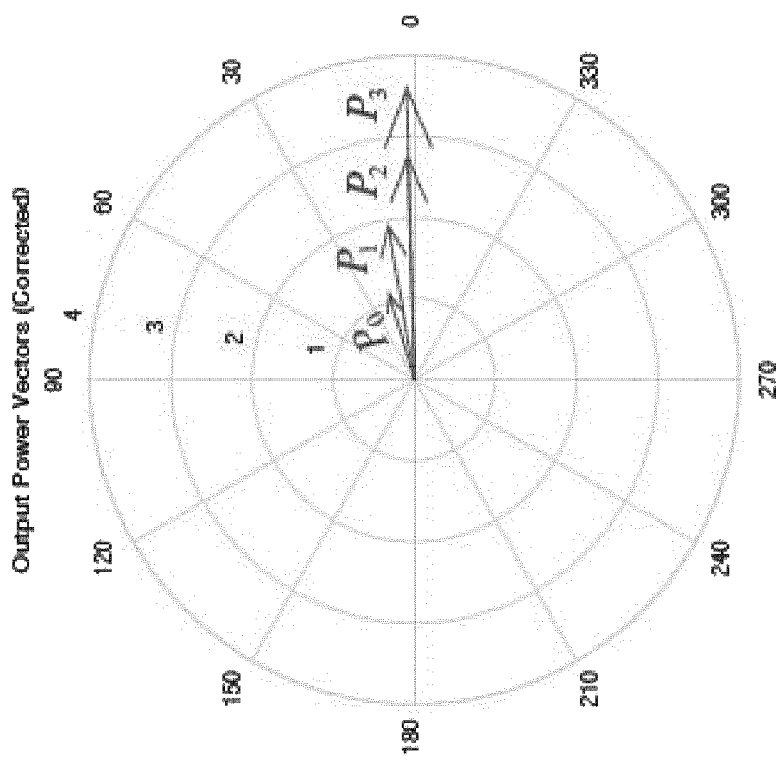
FIG. 25 shows a diagram of input power vectors and a diagram of output power vectors.
Figure 25:
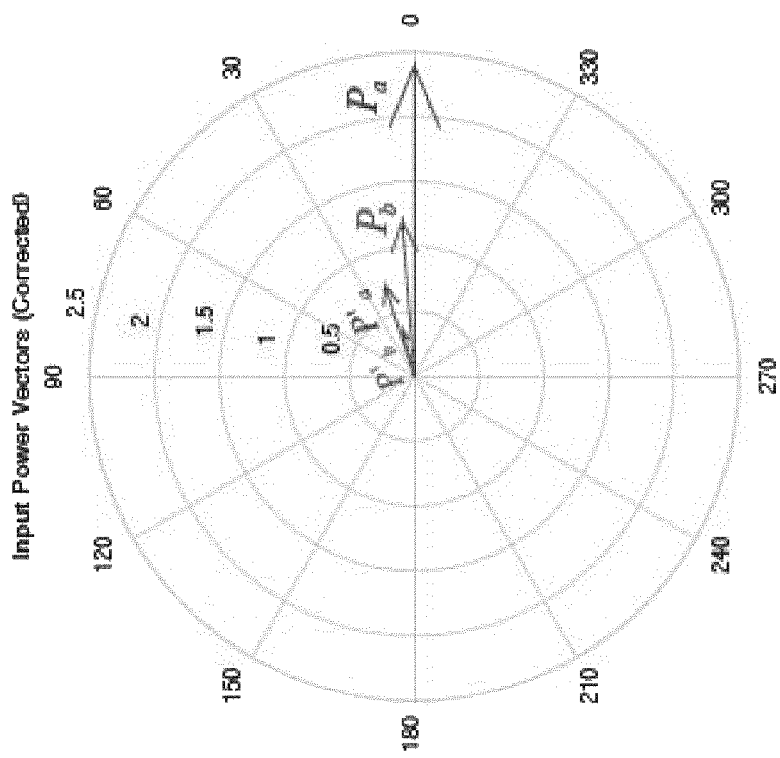
Figure 26:
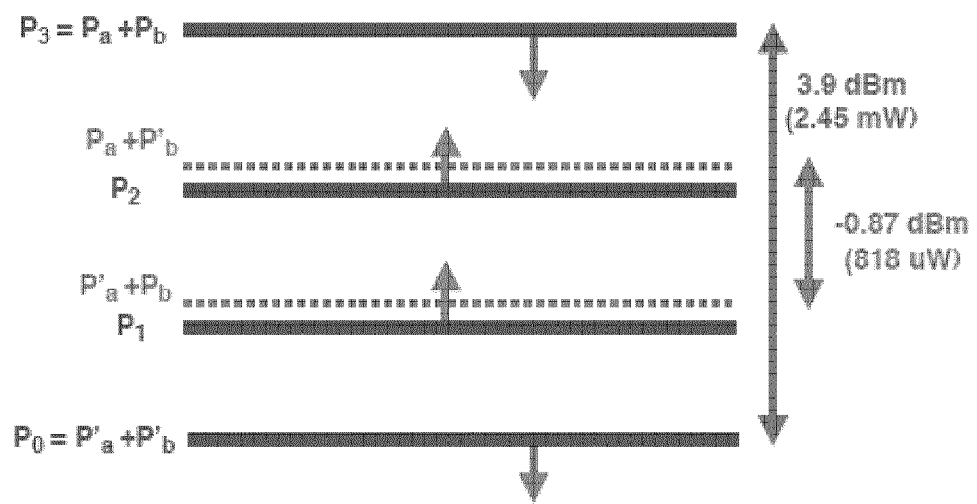
FIG. 26 shows a power level diagram.
Figure 27:
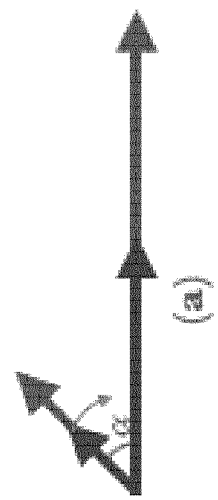
FIG. 27 shows three vector diagrams.
Figure 27:
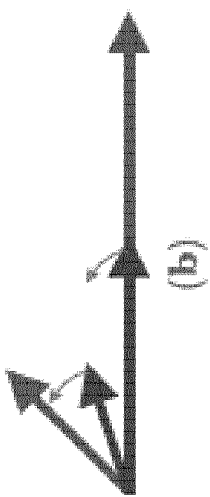
Figure 27:
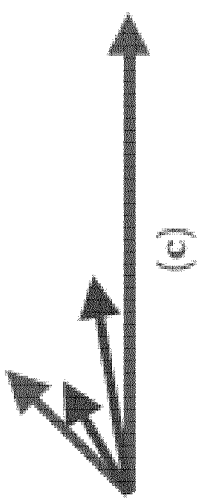
Figure 28:
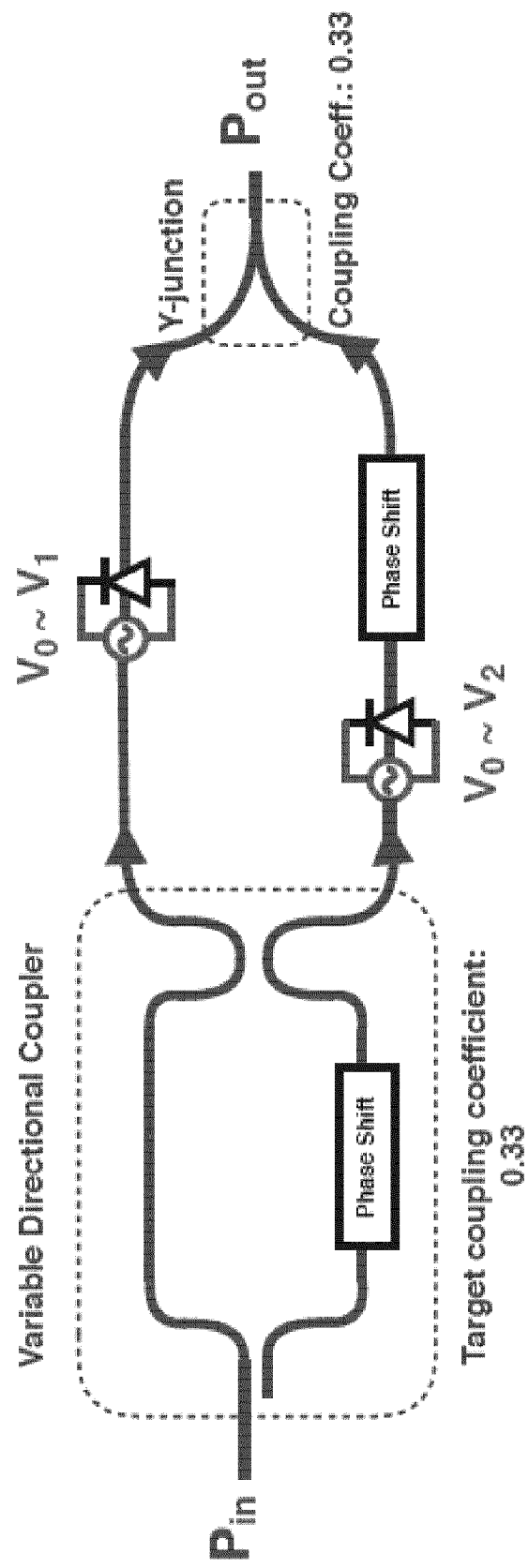
FIG. 28 shows an optical device.

FIGS. 20A and 20B show respective parts of a transmission system using the optical device described above and their desired properties.

The system starts from an optical source, in this case a laser 9801, producing light with a signal amplitude of around +11.9 dBm. The laser is coupled to a fibre 9802, which couples the light into a device 9803 according to the above description. The fibre should preferably incur no more than 2 dB loss at the attach points, and so the signal received by the device 9803 should have a signal amplitude of approximately +9.9 dBm. The device 9803 itself will incur a loss equivalent to the OMA link penalty, which may be approximately 6 dB. The result is a modulated signal with an OMA of approximately +3.9 dBm. This modulated signal is fed into a multiplexer 9804 'MUX' which may incur a loss of 1.5 dB, and so the resulting signal output OMA from the multiplexer is approximately +2.4 dBm. The light then passes through a Tx fibre 9805, which may incur a loss of around 1 dB at the attach point. Further losses are illustrated by box 9806 and 9807, which illustrate respectively the dispersion and transmission signal-to-noise ratio penalties (2.4 dB) and PAM-4 signal-to-noise ratio penalty (4.8 dB). The result is that a signal with an OMA of approximately −5.8 dBm is received by link fibre 9808. The link fibre 9808 can incur a loss of around 4 dB. The light then passes into an RX fibre 9809. The signal received by the Rx fibre should have an amplitude of approximately −9.8 dBm. The Rx fibre attach transmits the light into a demultiplexer 9810 'DeMUX', incurring a loss of around 1 dB at the attach point. The received signal by the demultiplexeter may have an amplitude of approximately −10.8 dBm. Finally, the signal is received by receiver 9811, having incurred a loss in the demultiplexer of around 3 dB its amplitude may be approximately −13.3 dBm.

All of the devices described above may be used in a photonic integrated circuit.

The invention is further disclosed in ANNEX 1 and ANNEX 2 enclosed herein.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The following numbered clauses contain statements of broad combinations of technical features in accordance with various aspects of the device and methods disclosed herein:

CLAUSE

1. An optical device, operable to provide a PAM-N modulated output, comprising:
    an input waveguide, configured to receive light;
    a first electro-absorption modulator, coupled to receive light from the input waveguide, and operable to produce a first output or a second output, wherein the second output has a lower amplitude than the first output;
    a second electro-absorption modulator, coupled to receive light from the input waveguide, and operable to produce a third output or a fourth output, wherein the fourth output has a lower amplitude than the third output; and
    an output waveguide, coupled to receive light from the first electro-absorption modulator and the second electro-absorption modulator, and output a combined signal comprising an output of the first electro-absorption modulator and an output of the second electro-absorption modulator;
wherein the first electro-absorption modulator and the second electro-absorption modulator are disposed in parallel.

2. The optical device of clause 1 further comprising:
    a variable input coupler, disposed between the input waveguide and both of the first electro-absorption modulator and the second electro-absorption modulator.

3. The optical device of clause 2, wherein the input coupler is configured to modify the light transmitted to the first electro-absorption modulator and the second electro-absorption modulator such that adjacent PAM-N modulated outputs generated by the device are linearly spaced.

4. The optical device of either clause 2 or clause 3, wherein the input coupler is configured to unequally split input light between the first electro-absorption modulator and the second electro-absorption modulator.

5. The optical device of any of clauses 2-4, wherein the input coupler comprises a Mach-Zehnder interferometer, comprising an input coupler coupled to the input waveguide, two parallel arms and an output coupler.

6. The optical device of clause 5, wherein at least one of the parallel arms includes a phase-shifter.

7. The optical device of any of clauses 1-6, wherein, disposed between the output waveguide and the first electro-absorption modulator and the second electro-absorption modulator is a variable output coupler.

8. The optical device of clause 7, wherein the output coupler is configured to modify the received light from the first electro-absorption modulator and the second electro-absorption modulator such that adjacent PAM-N modulated outputs are linearly spaced.

9. The optical device of either clause 7 or clause 8, wherein the output power of light which can be outputted by the coupler is described by:

$$P_{OUT} = \left| \sqrt{(1-k)P_{in1}}\, e^{j\theta_1} + \sqrt{(k)P_{in2}}\, e^{j\theta_2} \right|^2$$

where $P_{OUT}$ is the output power, k is a coupling coefficient $P_{in1}$ is the input power from the first electro-absorption modulator, $\theta_1$ is the phase of light entering the coupler from the first electro-absorption modulator, $P_{in2}$ is the input power from the second electro-absorption modulator, and $\theta_2$ is the phase of light entering the coupler from the second electro-absorption modulator.

10. The optical device of clause 9, wherein k is less than 0.44.

11. The optical device of any of clauses 7-10, wherein the variable output coupler is a Mach-Zehnder interferometer, comprising an input coupler coupled to the first electro-absorption modulator and the second electro-absorption modulator, two parallel arms and an output coupler coupled to the output waveguide.

12. The optical device of clause 11, wherein at least one of the parallel arms includes a phase-shifter.

13. The optical device of any of clauses 1-12, further comprising:
    a first analogue driver, said first driver configured to provide a first driver signal to the first electro-absorption modulator; and
    a second analogue driver, said second driver configured to provide a second driver signal to the second electro-absorption modulator;
    wherein, when driven by the respective driver signal, the first electro-absorption modulator produces the second output and the second electro-absorption modulator produces the fourth output.

14. The optical device of clause 13, wherein the first driver signal and the second driver signal are identical.

15. The optical device of any of clauses 1-14, wherein the optical device includes a Mach-Zehnder interferometer, and the first electro-absorption modulator is disposed within a first arm of the Mach-Zehnder interferometer and the second electro-absorption modulator is disposed within a second arm of the Mach-Zehnder interferometer.

16. The optical device of any of clauses 1-15, wherein the device includes a phase-shifter associated with at least one of the electro-absorption modulators, said phase-shifter being operable to modify a phase shift associated with the respective electro-absorption modulator.

17. The optical device of clause 16 as dependent on clause 15, wherein the phase-shifter is disposed within an arm of the Mach-Zehnder interferometer.

18. The optical device of either clause 16 or 17, wherein the phase-shifter is any one or more of: a heater; a PIN phase shifter; or a PN phase shifter.

19. The optical device of any of clauses 15-18, further including a directional coupler coupled to the output waveguide, configured to redirect a portion of the output power for use to bias and stabilize the phase shifter.

20. The optical device of clause 19, wherein the portion of the output power is less than 5%.

21. A Mach-Zehnder interferometer, comprising:
an input waveguide;
an output waveguide;
a first arm, optically connecting the input waveguide and the output waveguide;
a second arm, optically connecting the input waveguide and the output waveguide, the second arm being disposed in parallel with the first arm; and
at least two electro-absorption modulators, disposed respectively in the first arm and the second arm, and operable to provide PAM-N modulation.

TEXT

An optical device, operable to provide a PAM-N modulated output. The device comprising: an input waveguide, configured to receive light; a first electro-absorption modulator, coupled to receive light from the input waveguide, and operable to produce a first output or a second output, wherein the second output has a lower amplitude than the first output; a second electro-absorption modulator, coupled to receive light from the input waveguide, and operable to produce a third output or a fourth output, wherein the fourth output has a lower amplitude than the third output; and an output waveguide, coupled to receive light from the first electro-absorption modulator and the second electro-absorption modulator, and output a combined signal comprising an output of the first electro-absorption modulator and an output of the second electro-absorption modulator. Wherein the first electro-absorption modulator and the second electro-absorption modulator are disposed in parallel.

ANNEX 1

Caltech/Rockley Parallel PAM-4 EAM Transmitter Design
Review report: Dec. 2, 2016
Arian Hashemi, Prof. Azita Emami
Over Specifications:
The target specifications for a complete PAM-4 transmitter is provided below:
The equation used for the OMA link penalty for the EAM is as follows:

$$LP = \left|10.\log\left(\frac{P_{out,max} - P_{out,min}}{P_{in}}\right)\right|$$

FIG. 20A

FIG. 20B

The target specifications For a generated PAM-4 signal in the optical domain the input signal to the MUX in figure are as follows:

OMA Link Penalty: As low as possible
Min Extinction Ratio: 5 dB (IEEE standard: 4.5 dB)
Saturation Power: +8 dBm (6.3 mW) (Input to each EAM)
Optical Line width: ±12 nm According to the above target specs, we target an extinction ratio of 5 to calculate the exact necessary output power levels generated by each of the EAMs in each optical arm. Neglecting EAM refractive index changes under operation, the ideal system would consist of two parallel arms as follows:

FIG. 12

FIG. 13

The combined output power, as well as individual powers generated by the EAMs could he calculated as follows:

$$OMA_{total} = P_3 - P_0 = 2.45 \text{ mW} \quad P_3 = 3.58 \text{ mW} \quad (1)$$
$$ER = 10\log\left(\frac{P_3}{P_0}\right) = 5 \quad \Rightarrow \quad P_2 = 2.77 \text{ mW}$$
$$P_1 = 1.95 \text{ mW}$$
$$P_{i+1} - P_i = \frac{OMA_{total}}{3} = 817 \ \mu W \quad P_0 = 1.13 \text{ mW}$$

These 4 output power levels should be generated by power combinations of the two arms of the modulator ($P_a$, $P_{a'}$, $P_b$ and $P_{b'}$ in FIGS. 2 and 3). However, one should consider the fact that these EAM output powers will not be linearly added to generate the final levels ($P_0$ through $P_3$) unless under certain conditions described below, which do not hold generally:

FIG. 14A

In fact the field vectors are added up to provide the output power. Hence, the output power for a symmetric coupler would be:

$$\text{With phase difference: } P_{out} = \left|\frac{1}{\sqrt{2}}\sqrt{P_{in1}}\,e^{j\theta_1} + \frac{1}{\sqrt{2}}\sqrt{P_{in2}}\,e^{j\theta_2}\right|^2 \quad (2)$$

$$\text{No phase difference: } P_{out} = \left|\frac{1}{\sqrt{2}}\sqrt{P_{in1}} + \frac{1}{\sqrt{2}}\sqrt{P_{in2}}\right|^2 \quad (3)$$

Therefore, even with zero phase difference, the output power would not be the linear addition of the two A more general case would he having a coupler with the coupling coefficient of "k":

FIG. 14B

And the equations of the output power are:

$$\text{With phase difference: } P_{out} = \left|\sqrt{(1-k)P_{in1}}\,e^{j\theta_1} + \sqrt{(k)P_{in2}}\,e^{j\theta_2}\right|^2 \quad (4)$$

$$\text{No phase difference: } P_{out} = \left|\sqrt{(1-k)P_{in1}} + \sqrt{(k)P_{in2}}\right|^2 \quad (5)$$

Considering the above phenomenon, and ignoring the index change of the EAMs for now, the equations describing the generation of the 4 output levels would be as follows:

$$\sqrt{(1-k)P_a} + \sqrt{kP_b} = \sqrt{P_3} \quad (6\text{-}1)$$

$$\sqrt{(1-k)P_a} + \sqrt{kP_{b'}} = \sqrt{P_2} \quad (6\text{-}2)$$

$$\sqrt{(1-k)P_{a'}} + \sqrt{kP_b} = \sqrt{P_2} \quad (6\text{-}3)$$

$$\sqrt{(1-k)P_{a'}} + \sqrt{kP_{b'}} = \sqrt{P_0} \quad (6\text{-}4)$$

This is a set of 4 non-linear equations and 5 unknowns ($P_a$, $P_{a'}$, $P_b$, $P_{b'}$, and k). However, one can observe that the terms with $P_a$ and $P_{a'}$ always show up with the term (1−k) and the terms with $P_b$ and $P_{b'}$ with the term (k). Therefore, to simplify the equations, one can rewrite them in the following form:

$$a+b = \sqrt{P_3} \quad (7\text{-}1)$$

$$a+b' = \sqrt{P_2} \quad (7\text{-}2)$$

$$a'+b = \sqrt{P_1} \quad (7\text{-}3)$$

$$a'+b' = \sqrt{P_0} \quad (7\text{-}4)$$

We now have a set of 4 linear equations with 4 unknowns. Since the left-hand sides of the equations are dependent (i.e. a linear combination of 3 chosen equations can build the 4th one), the associated matrix A to this system is singular (if we write the system above in the form Ax=b which "x" is the vector of the unknowns, the 4-by-4 matrix A would have a rank of 3 rather than 4).

Hence, according to the right-hand sides of the set, the system will either have infinite answers or no exact solution. By applying the same linear combination of the 3 chosen left-hand side equations to the right-hand side, we realize that for the system to have infinite solutions (rather than having no solutions) it should be required that:

$$\sqrt{P_1} + \sqrt{P_2} = \sqrt{P_0} + \sqrt{P_3} \quad (8)$$

And since we know that the output power levels should be equally spaced, we should also have:

$$P_1 + P_2 = P_0 + P_3 \quad (9)$$

Equation 8 does not hold for the values calculated in equation and in fact it does not hold for any set of 4 target output powers satisfying equation (9). Therefore, the equation set (7-1) through (7-4) is always a non-consistent system with no solutions.

Proposed Solution:

To still go forward, one should come up with a set of values for the unknowns a, b, a' and b' to somehow minimize the "error" of the system Ax=b. This will turn into a convex optimization problem. There are several factors to consider to minimize for this system to "estimate" the solution of the system.

Solution) We first derive an equation for an unequally spaced PAM-4 bit-error-rate:

Assumptions: Symbols are equally-likely transmitted
Noise is Gaussian
Noise and its power is independent from the optical signal

FIG. 15

The symbol error rate would then be (N0 is the gaussian noise power in (mW/Hz)):

$$P_s = \frac{1}{2}\left[Q\left(\sqrt{\frac{\Delta P_1}{2N_0}}\right) + Q\left(\sqrt{\frac{\Delta P_2}{2N_0}}\right) + Q\left(\sqrt{\frac{\Delta P_3}{2N_0}}\right)\right] \quad (11)$$

-continued $$Q(x) = \frac{1}{2\pi}\int_x^\infty e^{\left(-\frac{t^2}{2}\right)} dt \quad (12)$$

It is observed from equation (11) that the dominant factor affecting the BER will be the smallest eye, as the changes in the Q function are steep as the argument goes beyond 7 to achieve a BER of the order −12.

Therefore, the constraints that should be put in the optimizer would result in solving the following problem:

System: $Ax = b$ \quad (13)

Optimization parameters:
$\min(|eye_3 - eye_2|^2)$
$\min(|eye_2 - eye_1|^2)$
$\min(|eye_1 - eye_3|^2)$ $$x = \begin{bmatrix} a \\ a' \\ b \\ b' \end{bmatrix}, b = \begin{bmatrix} \sqrt{P_3} \\ \sqrt{P_2} \\ \sqrt{P_1} \\ \sqrt{P_0} \end{bmatrix}, A = \begin{bmatrix} 1 & 1 & 0 & 0 \\ 1 & 0 & 1 & 0 \\ 0 & 1 & 1 & 0 \\ 0 & 1 & 0 & 1 \end{bmatrix}$$

Constraints: $eye_i \geq \frac{OMA_{outer}}{3}$ for $i = 1, 2, 3$

Results: The results of the optimization are as follows:

FIG. 16

Here, the levels are still unequally spaces, however, the minimum eye (bottom) is still larger than the minimum eye closure requirement. Again we recall that the answers are independent from the value we will choose for "k" later. Hence, the required ERs fix each arm would also be calculated as follows:

$$\begin{aligned} a &= \sqrt{(1-k)P_a} \\ a' &= \sqrt{(1-k)P_{a'}} \end{aligned} \Rightarrow ER_1 = 10\log\left(\left(\frac{a}{a'}\right)^2\right) = 6.33 \text{ dB} \quad (14)$$

$$\begin{aligned} b &= \sqrt{(1-k)P_b} \\ b' &= \sqrt{(1-k)P_{b'}} \end{aligned} \Rightarrow ER_2 = 10\log\left(\left(\frac{b}{b'}\right)^2\right) = 3.49 \text{ dB}$$

We should now determine the optimum coupling coefficient "k" to use the minimum input power to the modulator. The plots in FIG. 9 show that, by sweeping over "k", one can achieve different combinations of the EAM output powers necessary for operation. From these data, and considering the insertion loss for each arm, the necessary input power to the EAMS and their sum (which would be our measure for the total input power) are provided in FIG. 10.

FIG. 17A FIG. 17B

While considering the input power to each EAM should not pass +8 dBm (the gold line in FIG. 10), one can observe that the optimum "k" would be 0.39 minimizing the necessary total input power. However, due to the saturation input power constraint, we will also consider the point which k=0.3.

Using MMIs for the coupling and the splitting junctions and assuming an excess loss of 0.1 dB for each, the first proposed circuit along with the required specs are provided below:

FIG. 18

TABLE 1

Modulator specs for k = 0.39

| Sections | EAM Lengths (um) | ER (dB) | $P_{off}$ (mW) | $P_{on}$ (mW) | $P_{in}$ (mW) | IL (dB) | LP (dB) |
|---|---|---|---|---|---|---|---|
| Arm 1 | 66 | 6.33 | 2.18 | 0.51 | 7.45 | 5.34 | 6.49 |
| Arm 2 | 48 | 3.49 | 2.12 | 0.95 | 5.00 | 3.73 | 6.3 |
| Total | — | 4.95 | 4.26 | 1.36 | 12.46 | 4.66 | 6.33 |

TABLE 2

Modulator specs for k = 0.3

| Sections | EAM Lengths (um) | ER (dB) | $P_{off}$ (mW) | $P_{on}$ (mW) | $P_{in}$ (mW) | IL (dB) | LP (dB) |
|---|---|---|---|---|---|---|---|
| Arm 1 | 66 | 6.33 | 1.9 | 0.44 | 6.49 | 5.34 | 6.49 |
| Arm 2 | 48 | 3.49 | 2.74 | 1.23 | 6.44 | 3.72 | 6.3 |
| Total | — | 4.95 | 4.26 | 1.36 | 12.94 | 4.82 | 6.49 |

ANNEX 2

Caltech/Rockley Parallel PAM-4 EAM Transmitter Design
Review report: Nov. 11, 2016
Arian Hashemi, Prof. Azita Emami
Overall Specifications:
The target specifications for a complete PAM-4 transmitter is provided below: The equation used for the OMA link penalty for the LAM is as follows:

$$LP = \left|10.\log\left(\frac{P_{out,max} - P_{out,min}}{P_{in}}\right)\right|$$

FIG. 20A

FIG. 20B

Figure 1:
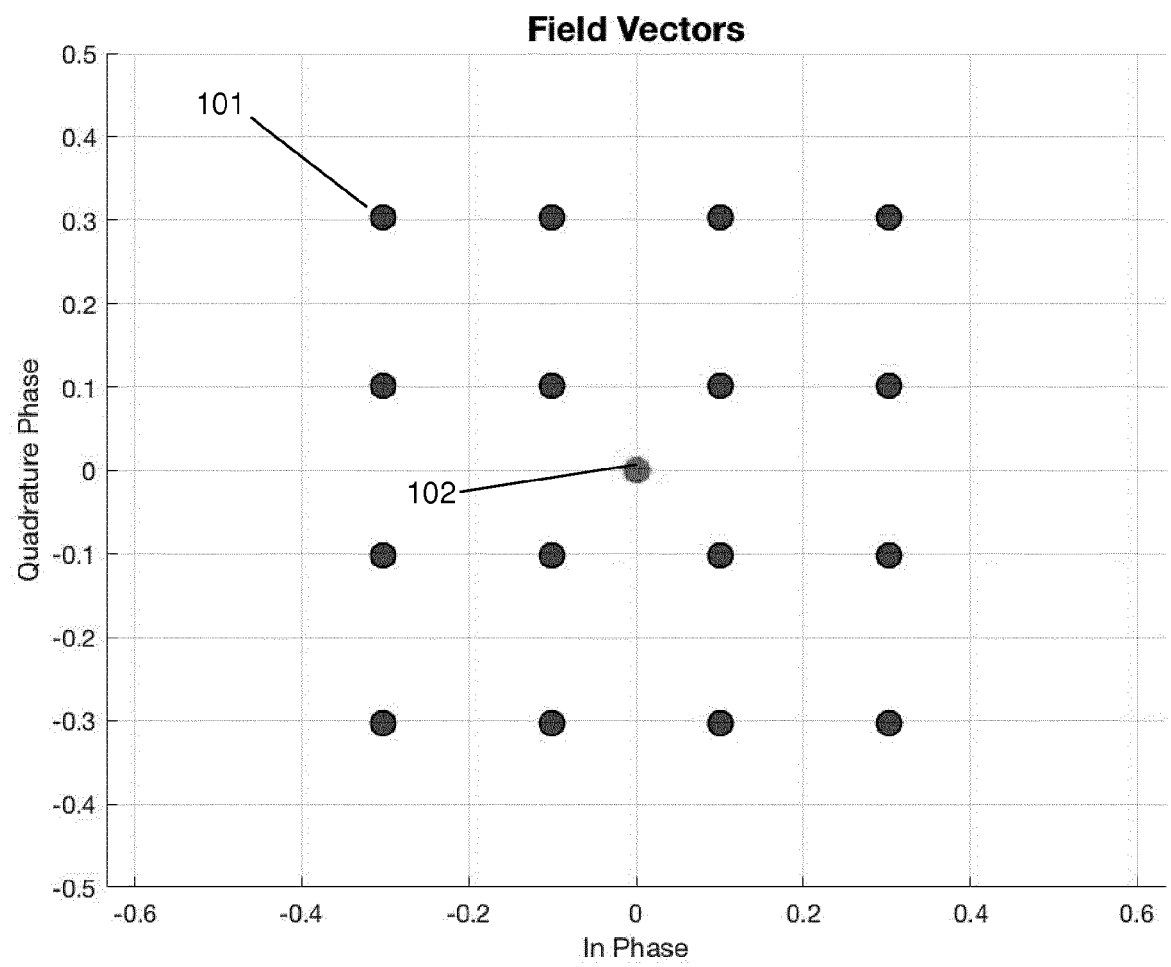
FIG. 1 shows a constellation diagram illustrating QAM-16 modulation.

The target specifications for a generated PAM-4 signal in the optical domain the input signal to the MUX in FIG. 1) are as follows:
OMA Link Penalty: As low as possible
Extinction Ratio: 5 dB (IEEE, standard: 4.5 dB)
Saturation Power: +8 dBm (6.3 mW (Input to each EAM)
Optical Line width: ±12 nm According to the above target specs, we target an extinction ratio of 5 to calculate the exact necessary output power levels generated by each of the EAMs in each optical arm. Neglecting EAM refractive index changes under operation, the ideal system would consist of two parallel arms as follows:

FIG. 12

FIG. 13

The combined output power, as well as individual powers generated by the EAMs could be calculated as follows:

$OMA_{total} = P_3 - P_0 = 2.45$ mW $ER = 10\log\left(\frac{P_3}{P_0}\right) = 5$ $\Rightarrow$ $P_0 = P'_a + P'_b = 1.133$ mW $= 0.54$ dBm
$P_3 = P_a + P_b = 3.587$ mW $= 5.54$ dBm
$P_a - P'_a = 2 \times 818$ μw $= 2.14$ dBm
$P_b - P'_b = 818$ μw $= -0.87$ dBm The absolute values for $P_0$ through $P_3$ are now defined. However, there are infinite combinations for the EAMs to produce these power levels (i.e. $P_a + P_b = 5.54$ dBm but $P_a$ and $P_b$ are not still defined individually and the above 4 equations are not all independent). By sweeping $P_a$ over a reasonable region considering noise existence and limits on input saturation powers to each EAM, we can plot the needed extinction ratios for both arms at each specific input power fed to the EAMs:

FIG. 21

Extinction Ratio for Each Arm of the PAM-4 Transmitter as a Function of Input Power to the First a Since a single typical EAM device of length 46 um achieves an extinction ratio of 4.7, we call put an upper limit for the maximum achievable extinction ratio around 7, since higher values would require a length more than 70 um. Moreover, longer devices would require higher input power to operate which exceeds the saturation power since the insertion loss increases with length also we should keep in mind that a using certain length would result, in an almost constant ER over a line-width more than ±12 nm. Hence, we can associate any length to its specific resulting ER).

The following 4 points were chosen and the resulting input/output powers are listed in table 11 as follows:

FIG. 22

Choosing 4 Points to Analyze the Resulting Specs

TABLE 1

Specs comparison for the chosen 4 points in FIG. (5)

| Point Number | EAM Lengths (um) | ER (dB) | $P_a, P'_a$ (mW) | $P_b, P'_b$ (mW) | $P_{in, a}$ (mW) | $P_{in, b}$ (mW) | LP (dB) |
|---|---|---|---|---|---|---|---|
| 1 | 57.9 | 6 | 2.2 | 1.39 | 5.45 | 2.6 | 7.4 |
|   | 37.6 | 3.9 | 0.55 | 0.57 |  |  |  |
| 2 | 50 | 5 | 2.39 | 1.2 | 5.28 | 2.75 | 5.08 |
|   | 50 | 5 | 0.73 | 0.36 |  |  |  |
| 3 | 46 | 4.7 | 2.47 | 1.11 | 5.16 | 2.79 | 5.11 |
|   | 55.5 | 5.76 | 0.84 | 0.3 |  |  |  |
| 4 | 41.8 | 4.3 | 2.6 | 0.99 | 5.1 | 3.25 | 5.32 |
|   | 73.4 | 7.6 | 0.96 | 0.17 |  |  |  |

As one can observe, there is an optimum point around $P_a = 2.39$ mW that minimizes the OMA link penalty while the sum of required input power to both EAMs are approximately constant. There is another advantage with this optimum point: the length of both EAMs are equal to 50 um. This would be advantageous when we will analyze index change during operation later in this review.

EAM Index Changes:

Since the output power vectors of each EAM rotate as we apply driving voltages to them, we will not get the above calculated power values after combinations.

To analyze the problem of phase change, one can observe that the output field vectors of each EAM rotates as we apply a certain voltage to drive them. Also changing the length of the EAMs would result in different phase changes. Assuming that the lengths are equal (50 um) and that the input power does not significantly alter the index characteristics of the EAMs we can compensate for the unequal combined output power levels as follows:

FIG. 23

Generated Power Vectors by EAMs and the Effects of Index Change

FIG. 24

Combined Output Power Levels and the Unequal Differences Due to Index Change Effect By manipulating the power vectors, one can correct the output power levels to equalize the eye openings. One way to do so, is to decrease the angle alpha for the red vectors in FIG. 6 and bring them inside the other blue vectors. By doing so, the resulting P0 and P3 power levels would decrease while power levels P1 and P2 would increase simultaneously. Therefore, there will be a point that all power levels will be equally spaced and that would be the point of interest.

FIG. 25

Corrections for the Second Arm Vectors to Generate Equally Spaced Power Levels

FIG. 26

Changing Power Levels as the Red Vectors Get Corrected Circuit Implementation:

Since we have chosen the EAM lengths to he both equal to 50 um, we expect the separation angles (alpha) between the resulting vectors be also equal initially, as we apply equal driving voltages. Hence, to decrease the separation angle for the red vectors (second arm), we would need to decrease the corresponding driving voltage, as well as shifting both vectors by a phase shifter so that the they are both "inside" the other two blue vectors, as depicted in FIG. 10 below:

FIG. 27

Correcting the Second Arm Vectors: a) Before Correction b) After Decreasing the Driving Voltage c) After Shifting the Phase in the Second Arm After the correction, the power levels will he equally spaced but the resulting total OMA would decrease and hence the OMA link penalty would increase) slightly To compensate this deterioration, one could target for a larger OMA initially. The following schematics are proposed that includes all the vector operations above:

FIG. 28

Proposed Schematics of the Optical Circuit (According to the literature, wee assume a loss of 0.3 dB per each directional coupler/Y-junction) The coupling coefficients of the directional couplers and the Y-junction (or the MMI) are chosen so that a correct proportions of power are inserted into the arms and so that they are combined to get the maximum possible intensity at the output port.

FIG. 19

Proposed Schematics

The invention claimed is:

1. An optoelectronic device for quadrature-amplitude modulation (QAM), comprising:
an input waveguide;
a first intermediate waveguide, a second intermediate waveguide, a third intermediate waveguide, and a fourth intermediate waveguide, each coupled to the input waveguide via an input coupler; and
an output waveguide, coupled to each of the first to fourth intermediate waveguides via an output coupler,
wherein each intermediate waveguide includes a modulating component connected in series with a phase shifting component, and each modulating component is connected to a respective electronic driver, the respective electronic drivers together being operable to produce a QAM modulated output from light entering the optoelectronic device from the input waveguide,
wherein the input coupler or the output coupler comprises a first coupler comprising seven ports, a second coupler comprising three ports, and a third coupler comprising three ports, one of the seven ports of the first coupler being coupled to the input waveguide or the output waveguide, respectively,
wherein the remaining six of the seven ports of the first coupler are respectively coupled to the first intermediate waveguide, two of the three ports of the second coupler, two of the three ports of the third coupler, and the fourth intermediate waveguide,
wherein the remaining one of the three ports of the second coupler is coupled to the second intermediate waveguide, and
wherein the remaining one of the three ports of the third coupler is coupled to the third intermediate waveguide.

2. The optoelectronic device of claim 1, wherein each of the respective electronic drivers is a PAM-4 electronic driver, such that the respective modulating component can operate in four modulation states.

3. The optoelectronic device of claim 1, wherein the input coupler is configured to equally split input light between the first to fourth intermediate waveguides.

4. The optoelectronic device of claim 2, further comprising a DC phase shifting intermediate waveguide, coupled to the input waveguide via the input coupler and coupled to the output waveguide via the output coupler, the DC phase shifting intermediate waveguide being configured to re-center a constellation corresponding to the QAM outputs available from the optoelectronic device.

5. The optoelectronic device of claim 2, wherein a static phase difference between two of the first to fourth intermediate waveguides is set at 90°.

6. The optoelectronic device of claim 1, wherein each of the phase shifting components is a DC phase shifter.

7. The optoelectronic device of claim 1, wherein each of the respective electronic drivers is a binary non-return-to-zero driver, such that the respective modulating component can be operated in two modulation states.

8. The optoelectronic device of claim 1, wherein the input coupler is configured to split input light between the first to fourth intermediate waveguides at a ratio of 2:1:2:1, such that two of the first to fourth intermediate waveguides receive twice the optical power of the other two of the first to fourth intermediate waveguides.

9. The optoelectronic device of claim 1, wherein each modulating component is a phase modulator.

10. The optoelectronic device of claim 1, wherein each modulating component is an amplitude modulator.

11. The optoelectronic device of claim 1, wherein each intermediate waveguide includes two modulating components connected in series, the two modulating components being:
   a phase modulator; and
   an amplitude modulator.

12. A method of modulating an optical signal using the optoelectronic device of claim 1 and according to a QAM scheme, the method comprising:
   providing an optical signal at the input waveguide;
   splitting the optical signal into a plurality of intermediate waveguides including the first and second intermediate waveguides, each coupled to the input waveguide via the input coupler;
   modulating the amplitude and phase of the optical signal present in each of the plurality of intermediate waveguides, according to the QAM scheme and by respective modulating components connected in series with respective phase shifting components, each of said modulating components being connected to and driven by a respective electronic driver; and
   recombining the optical signals in each of the plurality of intermediate waveguides into the output waveguide, coupled to each of the plurality of intermediate waveguides via the output coupler.

13. The optoelectronic device of claim 1, wherein the input coupler or the output coupler further comprises first and second coupling waveguides respectively coupling the two ports of the second coupler to the two corresponding ports of the first coupler, and
   wherein a shape of the first coupling waveguide is different from a shape of the second coupling waveguide.

14. The optoelectronic device of claim 13, wherein the shapes of the first and second coupling waveguides are configured such that light contributions input into the second coupler from the two corresponding ports of the first coupler, or input into the first coupler from the two corresponding ports of the second coupler, are in phase.

15. The optoelectronic device of claim 13, wherein a width of the first coupling waveguide decreases along a guiding direction of the first coupling waveguide from the corresponding port of the first coupler to a point along the first coupling waveguide, and
   wherein a width of the second coupling waveguide increases along a guiding direction of the second coupling waveguide from the corresponding port of the first coupler to a point along the second coupling waveguide.

16. The optoelectronic device of claim 15, wherein the width of the first coupling waveguide increases along the guiding direction of the first coupling waveguide from the point along the first coupling waveguide to the corresponding port of the second coupler, and
   wherein the width of the second coupling waveguide decreases along the guiding direction of the second coupling waveguide from the point along the second coupling waveguide to the corresponding port of the second coupler.

17. The optoelectronic device of claim 1, wherein a static phase difference between the first intermediate waveguide and the second intermediate waveguide is 180°, and a static phase difference between the third intermediate waveguide and the fourth intermediate waveguide is 180°, and
   wherein a static phase difference between the first intermediate waveguide and the third intermediate waveguide is 90°, and a static phase difference between the second intermediate waveguide and the fourth intermediate waveguide is 90°.

18. The optoelectronic device of claim 1, wherein each of the first, second, and third couplers is a multimode interference (MMI) coupler.

* * * * *